US008712325B2

(12) United States Patent
Leica et al.

(10) Patent No.: US 8,712,325 B2
(45) Date of Patent: Apr. 29, 2014

(54) DEVICE, SYSTEM, AND METHOD FOR LOGGING NEAR FIELD COMMUNICATIONS TAG INTERACTIONS

(71) Applicant: Research In Motion Limited, Waterloo (CA)

(72) Inventors: Marcel Florin Leica, Mississauga (CA); Michael William Brown, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/784,157

(22) Filed: Mar. 4, 2013

(65) Prior Publication Data
US 2013/0316647 A1    Nov. 28, 2013

Related U.S. Application Data

(63) Continuation of application No. 13/628,583, filed on Sep. 27, 2012.

(60) Provisional application No. 61/651,423, filed on May 24, 2012.

(51) Int. Cl.
*H04B 5/00* (2006.01)

(52) U.S. Cl.
USPC ........................................................ 455/41.1

(58) Field of Classification Search
USPC .............. 455/41.1, 41.2, 41.3, 566; 705/26.1, 705/26.9, 27.1
See application file for complete search history.

(56) References Cited

U.S. PATENT DOCUMENTS 8,239,276 B2 * 8/2012 Lin et al. ...................... 705/26.1
2010/0082447 A1 * 4/2010 Lin et al. ......................... 705/26

FOREIGN PATENT DOCUMENTS

EP          2442600 A1    4/2012
WO       2005081088 A1    9/2005

OTHER PUBLICATIONS

European Patent Office, Extended European Search Report dated Apr. 5, 2013, issued in European Patent Application No. 12186365.8-1858.
NFC Forum, "NFC Data Exchange Format (NDEF)—NDEF 1.0", Internet Citation Jul. 24, 2006, URL: http://www.nfc-forum.org/specs/spec_license/download_spec/0f5678cll4d295e2da0d902f4e7839846281fc44/NFCForum-TS-NDEF_1.0.pdf; Jan. 10, 2007.
NXP, NXP Launches its First Data Sharing App for Android, Mar. 24, 2011       http://www.nxp.com/news/press-releases/2011/03/nxp-launches-its-first-data-sharing-app, Last accessed Feb. 13, 2013.
European Patent Office, Extended European Search Report dated Sep. 16, 2013, issued in European Patent Application No. 13159504.3.

* cited by examiner

*Primary Examiner* — April G Gonzalez
(74) *Attorney, Agent, or Firm* — Norton Rose Fulbright Canada LLP

(57) ABSTRACT

An apparatus, method and system for categorizing, parsing, grouping and displaying Near Field Communication (NFC) tags for presentation on a user device, including storing in a computer readable medium of a log of ones of the tags read by or written by the user device, assessing at least one category for each of the logged tags, and displaying, in conjunction with at least one indicator indicative of the respective at least one category, of each of the logged tags on the user device.

36 Claims, 35 Drawing Sheets

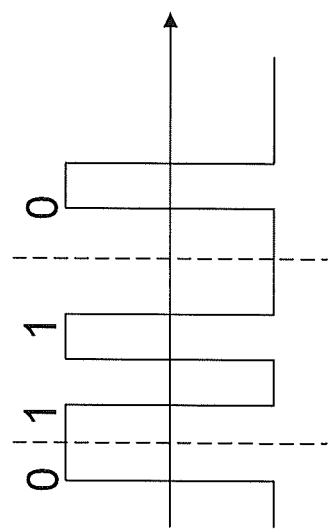
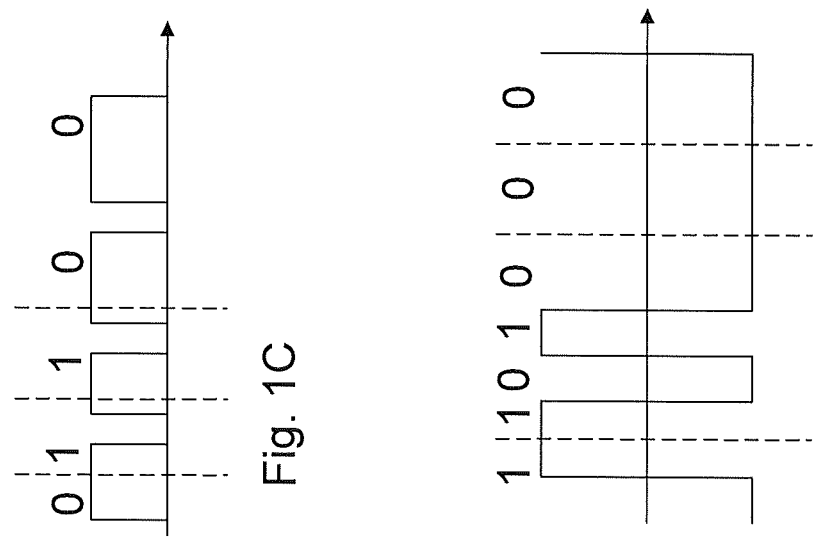

DEVICE, SYSTEM, AND METHOD FOR LOGGING NEAR FIELD COMMUNICATIONS TAG INTERACTIONS

CROSS-REFERENCE TO RELATED APPLICATIONS

This application claims all benefit, including priority, of U.S. Provisional Patent Application Ser. No. 61/651,423, filed 24 May 2012 and entitled DEVICE, SYSTEM, AND METHOD FOR LOGGING NEAR FIELD COMMUNICATIONS TAG INTERACTIONS; and of U.S. patent application Ser. No. 13/628,583, filed 27 Sep. 2012 and entitled DEVICE, SYSTEM, AND METHOD FOR LOGGING NEAR FIELD COMMUNICATIONS TAG INTERACTIONS; the entire contents of each of which is incorporated herein by reference, in its entirety This application claims benefit under 35 U.S.C. §119(e) of U.S. Provisional Patent App. Ser. No. 61/651,423, filed May 24, 2012, which is incorporated herein by reference in its entirety

BACKGROUND

1. Field of the Disclosure

This application relates to the field of communications, and more particularly, to mobile wireless communications devices and related methods that use Near Field Communications (NFC).

2. Description of the Background

Mobile communication systems continue to grow in popularity and have become an integral part of both personal and business communications. Various mobile devices now incorporate Personal Digital Assistant (PDA) features, such as calendars, email, address books, Internet ("Web"), task lists, calculators, memo and writing programs, media players, games, etc. For example, these multi-function devices usually allow users to send and receive electronic mail (email) messages wirelessly and access the internet via a cellular network, wireless wide area network (WWAN), and/or a wireless local area network (WLAN), for example.

Some mobile devices also incorporate contactless card reading technology, and/or Near Field Communication protocols, antenna, and/or chips to enable such contactless card reading technology. Near Field Communications (NFC) technology may be used for short-range communications. NFC may use magnetic field induction to enable communication between electronic devices, including, for example, mobile wireless communications devices, and to enable communications between, for example, devices and passive cards, tags, or the like. NFC communications are typically over short ranges, such as over distances of a few centimeters or less, and may be high frequency in nature. These short-range communications applications may include, for example, payment and ticketing, electronic keys, identification, device set-up service and similar information sharing, by way of non-limiting example.

An NFC connection may deliver, for example, data or information related to, for example, phone numbers, Uniform Resource Locators (URLs), contact information, geo-location, and the like.

As stated above, NFC technologies may employ physical or virtual tags, cards, and the like that may be read from, and/or written to, by NFC-enabled mobile devices. However, the read/write capabilities of typical NFC tags may be limited, particularly for physical tags. As such, NFC information transmitted may be limited to the small data assets such as those referenced above. Furthermore, once an NFC-enabled mobile device receives data assets via NFC, the device needs to display the assets in an intuitive manner.

BRIEF DESCRIPTION OF THE DRAWINGS

The accompanying drawings illustrate various aspects and exemplary embodiments of the herein disclosed devices, systems, and methods. In the drawings, like numerals represent like elements, and:

FIGS. 1A, 1B and 1C illustrate coding aspects compatible for use with an exemplary embodiment of the present disclosure;

DETAILED DESCRIPTION

Figure 2:
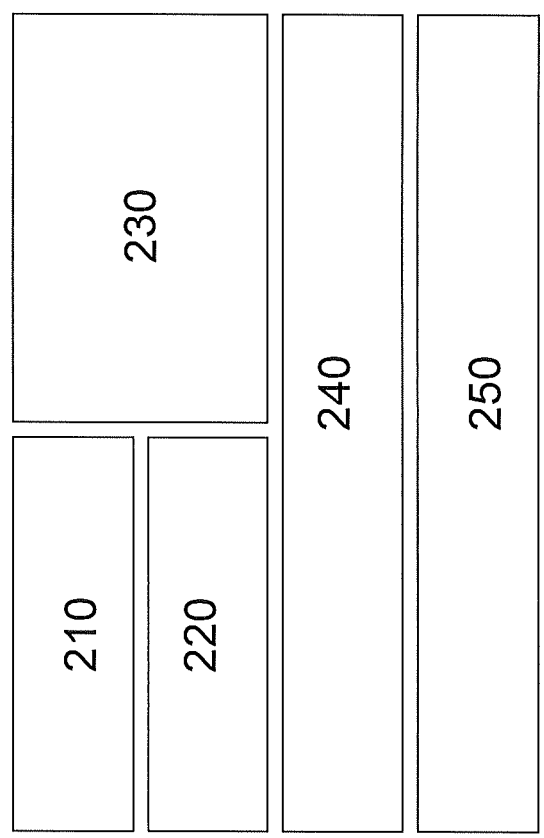
FIG. 2 illustrates a stack architecture for use with an exemplary embodiment of the present disclosure.

The figures and descriptions of the disclosure have been simplified to illustrate elements that are relevant for clear understanding, while eliminating, for the purposes of clarity and brevity, other elements found in typical communications, and particularly Near Field Communications, apparatuses, systems, and methods. Those of ordinary skill in the art will thus recognize the other elements and/or steps that are desirable and/or required in implementing the disclosure. However, because such elements and steps are well known in the art, and because they do not facilitate a better understanding of the present disclosure, a discussion of such elements and steps is not provided herein. The disclosure herein is nevertheless directed to all variations and modifications to the disclosed elements and steps that will be known or apparent to those skilled in the art in light of this disclosure. Of note, like numbers refer to like elements throughout the disclosure.

Near Field Communications (NFC) is a bidirectional and short range wireless communication technology which may operate at, for example, approximately 13.56 MHz and at a bandwidth of about 2 MHz. Standard NFC data rates may range from about 106 kbps to about 424 kbps, and may be used in a variety of operation modes, including, for example, reader/writer, peer-to-peer, and card emulation (i.e., where communication occurs between an NFC capable mobile device and a passive NFC/RFID tag, a second NFC capable mobile device, or an NFC capable reader). Each NFC operating mode may use a distinct communication interface, such as, for example, ISO/IEC 14443, ISO/IEC 18092 and ISO/IEC 15693, on the radio frequency (RF) layer. An NFC interaction may occur when an NFC capable device contacts and/or generates an active field allowing magnetic inductive coupling to transfer energy and data between the NFC devices, or between the NFC device and the tag/card.

As used herein, an NFC device may be or include a multi-function mobile device, and a NFC card/tag may represent a tag readable by, or understandable to, an NFC device, except as noted and as will be evident in light of the disclosure. An NFC device or tag with an internal power supply is considered active, whereas a device or tag having no power supply is considered passive. Passive devices or tags, such as smart cards, for example, may absorb energy (and receive data) from an active device through the aforementioned magnetic inductive coupling. Such a passive device or tag, when it is powered by at least one active device, may communicate and exchange data with the device or other devices. A tag may also be virtual, such as to indicate particular operations to a device in the same manner as would a physical NFC tag.

The security of NFC transmissions is provided principally by the relatively short distance such transmissions travel and the relatively low power at which they are transmitted for physical tags, and the maintenance of NFC operations within a device for virtual tags. In other words, the NFC communication link characteristics are used to limit the ability of third party devices to intercept a given NFC transmission or operation.

Further still, NFC capable devices or tags may include software applications and/or code used to verify and/or allow for a successful NFC interaction to occur between at least two devices, or between a device and a tag. Such an application, for example, may launch when a certain type of NFC interaction is detected and may verify that the pairing device or tag is authorized and/or is of an acceptable type. For example, a user of an active NFC capable mobile device may wish to ignore any interactions with other mobile devices. Similarly, an NFC capable device used for a specific purpose, such as for reading "smart" cards/tags, for example, may ignore requested interaction from any NFC capable device that is not recognized as a smart card/tag. Additionally, in known embodiments, a personal identification number (PIN) and/or security key or other credentials and/or information may also be exchanged between a first and second communications device using NFC, such as for establishing a wireless communications connection, such as a Bluetooth connection, a mobile telephone call or Internet connection, or other wireless connection, by way of example.

As mentioned above, physical NFC tags may be passive or active. In a situation in which an active NFC capable device is brought within range of a passive tag, or vice versa, the RF signal created by the active device generally provides sufficient energy to the tag to allow the tag to "boot up" and execute the at least one set of code resident on the tag. Such code may include an algorithm and may initiate a transfer of data to the active NFC capable device. Although active tags may communicate together each relying on their own respective power supply, a passive tag relies on the availability of a remote power source to initiate any actions, typically an active NFC device. Further, the data storage and transfer capabilities of passive tags are typically highly limited.

Although various types of physical tags may be created, there are four types of widely accepted tags (having the designations of Type 1, Type 2, Type 3 and Type 4), each having a different format and capacity. Type 1 tags are based on the ISO/IEC 14443 Type A standard, have read/write capabilities, may be modified during use, may contain a memory capacity up to 2 kB, use 16 or 32 bit digital security features, and may have a communication speed of up to 106 kbps. Type 2 tags are also based on the ISO/IEC 14443 Type A standard, have read/write capabilities, may be modified during use, may contain a memory capacity up to 2 kB, generally lack a security signature, and may have a communication speed of up to 106 kbps. Type 3 tags are based on the Sony FeliCa contactless smart card interface, may contain a memory capacity up to 2 kB, and may have a communication speed of up to 212 kbps. Type 4 tags are compatible with both the ISO/IEC 14443 Type A and Type B standards, are pre-configured during the manufacturing stage, are read and/or write only, may contain a memory capacity up to 32 kB, and may have a communication speed of up to 424 kbps.

Physical tags of each type may be coded, that is, may receive binary code, or the like, for the purpose of, and to enable, performing the data exchange discussed above, as will be understood to the skilled artisan. Thereby, the coding of a tag allows the tag to exchange data with an NFC-enabled reading device, i.e., coding encodes data to be transferred by the tag, as discussed throughout the disclosure.

As illustrated in FIGS. 1A-C, three coding techniques are most often used when transferring data using an NFC capable device, namely NRZ-L, Manchester, and Modified Miller. In NRZ-L coding, illustrated in FIG. 1A, a high state during one bit duration refers to a 1 bit and a low state expresses a 0 bit. NRZ-L coding uses 10% amplitude shift keyed (ASK) modulation and is compatible with data transfer speeds up to 848 kbps. Manchester coding, illustrated in FIG. 1B, utilizes the two different transitions that may occur at the midpoint of a period. A low-to-high transition expresses a 0 bit, whereas a high-to-low transition stands for a 1 bit. To achieve these conditions it is sometimes necessary to have a transition at the middle of a bit period, which may be disregarded. Manchester coding also 10% ASK modulation and is generally compatible with data transfer speeds of 106 kbps. Modified Miller code is characterized by the pauses occurring in the carrier at different positions of a period. Depending on the information to be transmitted, bits are coded as shown in FIG. 1C. A high or "1" is always encoded in the same way, but a low or "0" is encoded differently dependent upon what preceded it. Most mobile wireless communications devices operate in communications mode using a modified Miller code and 100% ASK modulation, with data transfer rates ranging from 212 kbps to 424 kbps. Further details are set forth in the Mobile NFC Technical Guidelines, Version 2.0, November 2007 by GSMA, the disclosure of which is hereby incorporated by reference in its entirety.

An exemplary NFC stack architecture (NFC stack) used in NFC communications and operations is illustrated in FIG. 2. An analog protocol 250 may be used to determine the operating range of an NFC capable device. A digital protocol 240 may be used to create a successful communication environment by establishing, for example, polling cycles and collision detection, in accordance with industry standards, such as, for example, those discussed herein. For example, and in accordance with the NFCIP-1 standard, responsive to sensing modulation of an initiator electromagnetic carrier field by the target device, the initiator device may perform an initial collision avoidance sequence by transmitting an ATR_REQ (attribute request) command to the target device. Responsive to receiving the ATR_REQ (attribute request) command, the target device may transmit a response called ATR_RES (attribute response).

Tag operations 220 may allow for commands and instructions to be successfully exchanged with specific tag types external or internal to the device, and may enable read/write capabilities with certain protocols external or internal to the device, such as, for example, NFC Data Exchange Format (NDEF). As will be appreciated by those skilled in the art, NDEF is an industry standard data format for NFC enabled devices.

Tag operations 220 may utilize the Record Type Definition (RTD) of NDEF, which provides a way to efficiently define record formats for applications 210. More particularly, RTD may consistently follow, in part, a Type Name Format (TNF) indicator, which may be used to indicate the value of the TYPE field for tag data. Such RTDs in the TNF may include, for example, Text RTD (provides an efficient way to store text strings in multiple languages by using the RTD mechanism and NDEF format), URI RTD (provides an efficient way to store Uniform Resource Identifiers (URI) by using the RTD mechanism and NDEF format), Smart Poster RTD (defines an NFC Forum Well Known Type to put URLs, SMSs or phone numbers on an NFC tag, or to transport them between devices, and builds on the RTD mechanism and NDEF format and uses the URI RTD and Text RTD as building blocks), Generic Control RTD (provides a simple way to request a specific action (such as starting an application or setting a mode) to an NFC capable device (destination device) from another NFC capable device, tag or card (source device) through NFC communication), Signature RTD (specifies the format used when signing single or multiple NDEF records, defines the required and optional signature RTD fields, and also provides a list of suitable signature algorithms and certificate types that can be used to create the signature), and Media Type RTD (may specify the type of media), among other formats.

Non-protocol or non-NDEF applications 230 may be also be included in the TNF convention, and may include vendor specific applications. These applications can be of any format and may still be indicated using the TNF convention, even if not be based on or compatible with generally accepted protocols, such as NDEF, for other purposes. In addition, Simple NDEF Exchange Protocol (SNEP) may be used in NFC communications. SNEP may allow an application on an NFC capable device to exchange NDEF messages with another NFC capable device when operating in peer-to-peer mode. The protocol may use Logical Link Control Protocol (LLCP) connection-oriented transport mode to provide a reliable data exchange.

Figure 3:
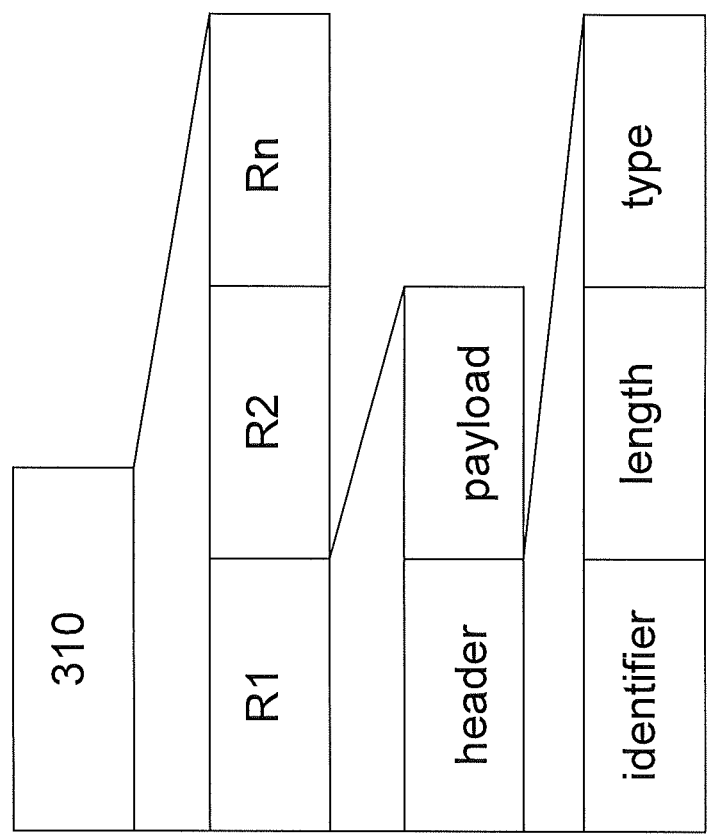
FIG. 3 illustrates coding aspects compatible for use with an exemplary embodiment of the present disclosure.

As illustrated in FIG. 3, an NDEF message 310, as an example, may be composed of one or more records (R1, R2, ..., Rn). The limit for the number of records that may be encapsulated into an NDEF message may depend upon the application in use and the tag type used, for example. As illustrated, each message may comprise of a sequence of records with each record consisting of at least two parts: a header and a payload. The header may include an indicator(s) for a variety of elements, such as payload length, payload type (such as using the TNF convention), and pay load identification. The payload length is included in the header is generally four octets long (although a zero is a valid payload length). Payload type indicates the kind of data being carried in the payload of that record. This may be used to guide the processing of the payload at the discretion of the controlling application. The payload identifier, and optional field, may allow applications to identify the payload carried within a given record. The payload itself may be of one of a variety of different types: URL, MIME media, or NFC-specific data type, for example. By way of example, for NFC-specific data types the payload contents may be defined in an RTD file, as discussed above.

Figure 4:
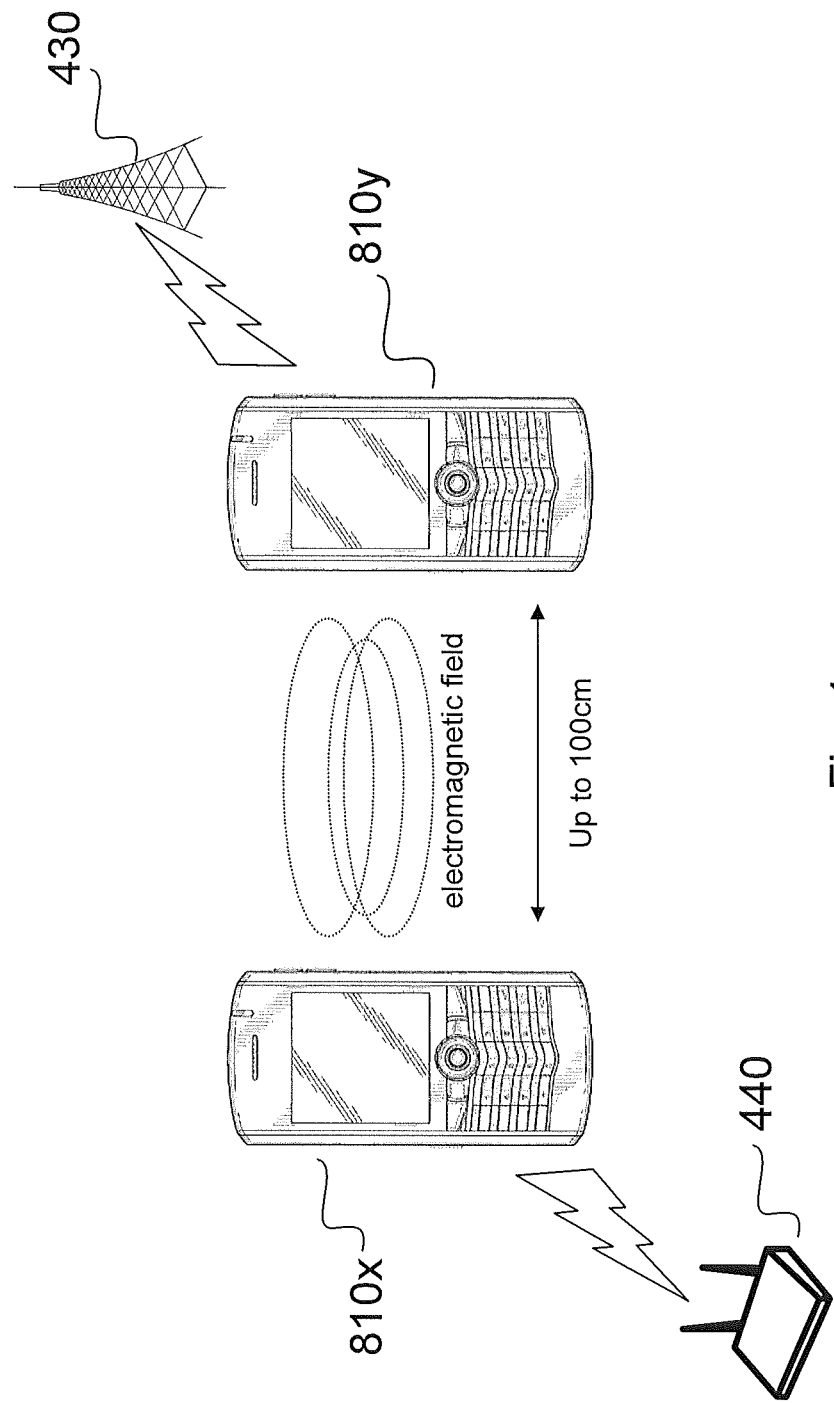
FIG. 4 illustrates communication aspects in accordance with an exemplary embodiment of the present disclosure.
Figure 5:
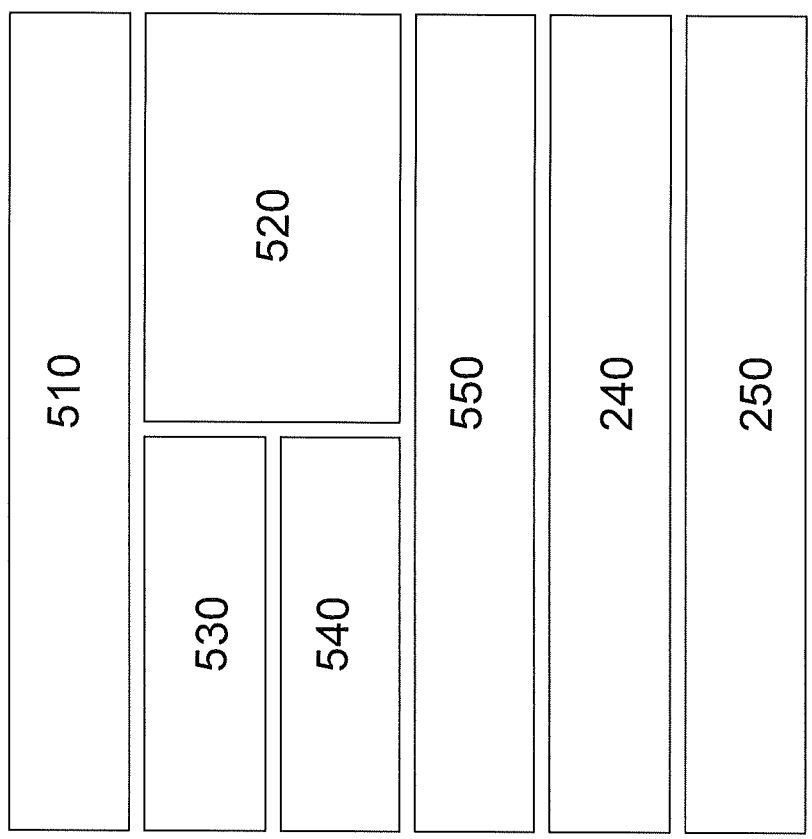
FIG. 5 illustrates a stack architecture for use with an exemplary embodiment of the present disclosure.

For peer-to-peer communications, as illustrated in FIG. 4, an exemplary stack architecture is illustrated in FIG. 5. As discussed above, analog protocol 250 may be used to determine the operating range of an NFC capable device. A digital protocol 240 may be used to create a successful communication environment by establishing, for example, polling cycles and collision detection, in accordance with industry standards, for example. Further, link logic control protocol (LLCP) 550 may facilitate the transfer of data between two devices engaged in peer-to-peer communication. The LLCP, in part, may define the open systems interconnection (OSI) data link protocol used to support the peer-to-peer communication. Further, protocols 540 and 530, may include original vendor and/or industry standard protocols and may interact with exchange protocols 520, which may facilitate the exchange of messages between the communicating devices and may allow for protocols 540 and/or 530, for example, to run over LLCP 550. Each protocol layer may contain security keys and may be used in an authentication process initiated between the at least two communication devices. Further, the application layer 510 may run on top of each of protocols 540, 530 and 520 and may include code as described herein.

Figure 6:
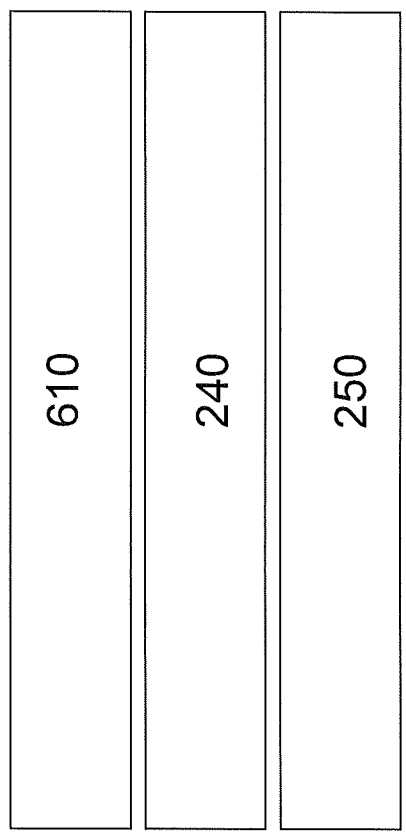
FIG. 6 illustrates a stack architecture for use with an exemplary embodiment of the present disclosure.

NFC capable devices may also operate in a card emulation mode using similar digital and analog protocols, in a manner compatible with known industry standards. Such emulation modes may include proprietary contactless card/tag applications such as payment, ticketing and access control. FIG. 6 illustrates a simplistic protocol stack for card emulation, i.e., for tag reading. As illustrated in FIG. 6, the protocol stack for card emulation allows card application 610 to ride on analog protocol 250, which may be used to determine the operating range of an NFC capable device, and digital protocol 240, which may be used to create a successful communication environment by establishing, for example, polling cycles and collision detection, in accordance with industry standards, such as, for example, those discussed herein.

As illustrated in FIG. 4, a first NFC capable device 810*x* may communicate via NFC communication with at least one other NFC capable device 810*y* when the devices are in close proximity to each other. Such interaction may be considered a peer-to-peer NFC interaction between the devices, even though each one of the devices may have the concurrent ability to communicate to other NFC capable devices and/or other communication means. For example, as illustrated, NFC capable device 810*y* may be engaged in peer-to-peer communication with NFC capable device 810*x* while communicating with baseband access 430, which may take the form of a cellular base station, for example. As will be appreciated by those skilled in the art, baseband communications may take place using various wireless communication means, such as CDMA, TDMA, FDMA, OFDMA, SC-FDMA, and other wireless protocols.

Similarly, NFC capable device 810*x* may be communicatively coupled to a wireless local area network WLAN 440, such as a Wireless Fidelity (WiFi) network, or a wireless wide area network (WWAN), such as 3GPP or 4G Long Term Evolution (LTE) (not shown), for example. By way of non-limiting example, and as will be appreciated by those skilled in the art, WiFi is typically deployed as a WLAN that may extend home and business networks to wireless medium and may follow an IEEE 802.11 standard. A wireless communications connection may also be established using, for example, short-range communications subsystems which may include an infrared device and associated circuits and components as described above, or a Bluetooth communications module, to provide for communication with similarly-enabled systems and devices as well as the NFC communications. By way of further example, the herein disclosed devices, systems, and methods may utilize any short-range communications subsystem which enables communication between at least two devices, whether proximate or not, including, for example, at least one server remote from a first device.

Figure 7:
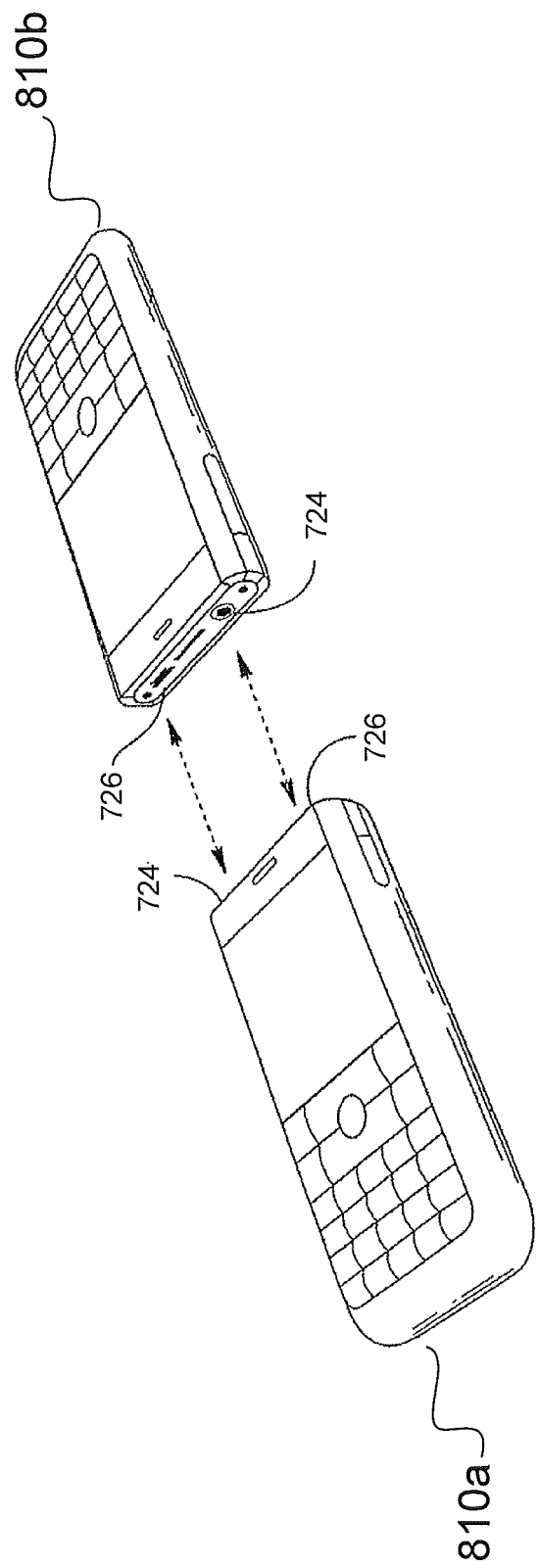
FIG. 7 illustrates communication aspects in accordance with an exemplary embodiment of the present disclosure.

FIG. 7 illustrates an example of two similar wireless communications devices 810*a*, 810*b* (this embodiment is also applicable in the event devices constitute device 810*a* and tag 950, as discussed further below) that are brought together as a physical movement towards each other into very close proximity or actual physical contact to provide a simple interface and initiate a wireless NFC connection. This physical gesture of moving a device near to or in contact with the other device provides a simple and lower-powered system and method of establishing a wireless connection, such as triggering the Hall Effect, which triggers the NFC, and/or which could also trigger a Bluetooth or WiFi wireless connection. In one non-limiting example, each device 810*a*, 810*b* is provided with a magnet 724 and an environment sensor 726, such as a Hall Effect sensor. Each is matched in a single touch or gesture, also termed a "kiss" gesture because the two devices 810*a*, 810*b* typically touch or "kiss" each other or are very close and in adjacent proximity. An example of this adjacency may be proximity in the range of about less than 10 or 20 mm, depending on the strength of the magnets, and in one example, about 7 mm or less between a tag and one of the devices, or between the two devices 810*a*, 810*b* in the illustration. The sensor 726 on each device is aligned to the magnet on the respective other device, as illustrated in FIG. 7. One device's sensor senses ("sees") the other's magnet via the Hall Effect, and a signal or voltage variation from the sensor is transmitted to a processor, which activates a Near Field Communication (NFC) circuit and communicates with the other device using the protocol of the NFC Stack. The devices can then read data from each other using NFC. Communications protocol data for a wireless connection, such as the Bluetooth connection, can also be obtained based on data received using the NFC connection. For example, PIN numbers and security keys could be exchanged using NFC to establish a Bluetooth connection.

As will be explained in detail below, a communications device 810*a* may likewise establish communication with a passive peripheral, such as a tag, by touching the device to the passive magnetic tag (NFC tag 950 in this example), thus initiating a NFC connection with the peripheral. As used herein, a passive magnetic tag, magnetic tag, or simply tag may refer to any of a variety of different devices, including NFC tags, RF ID tags, or other data storage devices with limited transmit capability. If the tag 950 is blank, the tag may be programmed by device 810*a* in some cases. If the tag is already programmed, the communications device 810*a* may read information from the tag, which may lead to further action. For example, if the tag is associated with a printer, the communications device can run a print job on the printer, as discussed further below.

Figure 8:
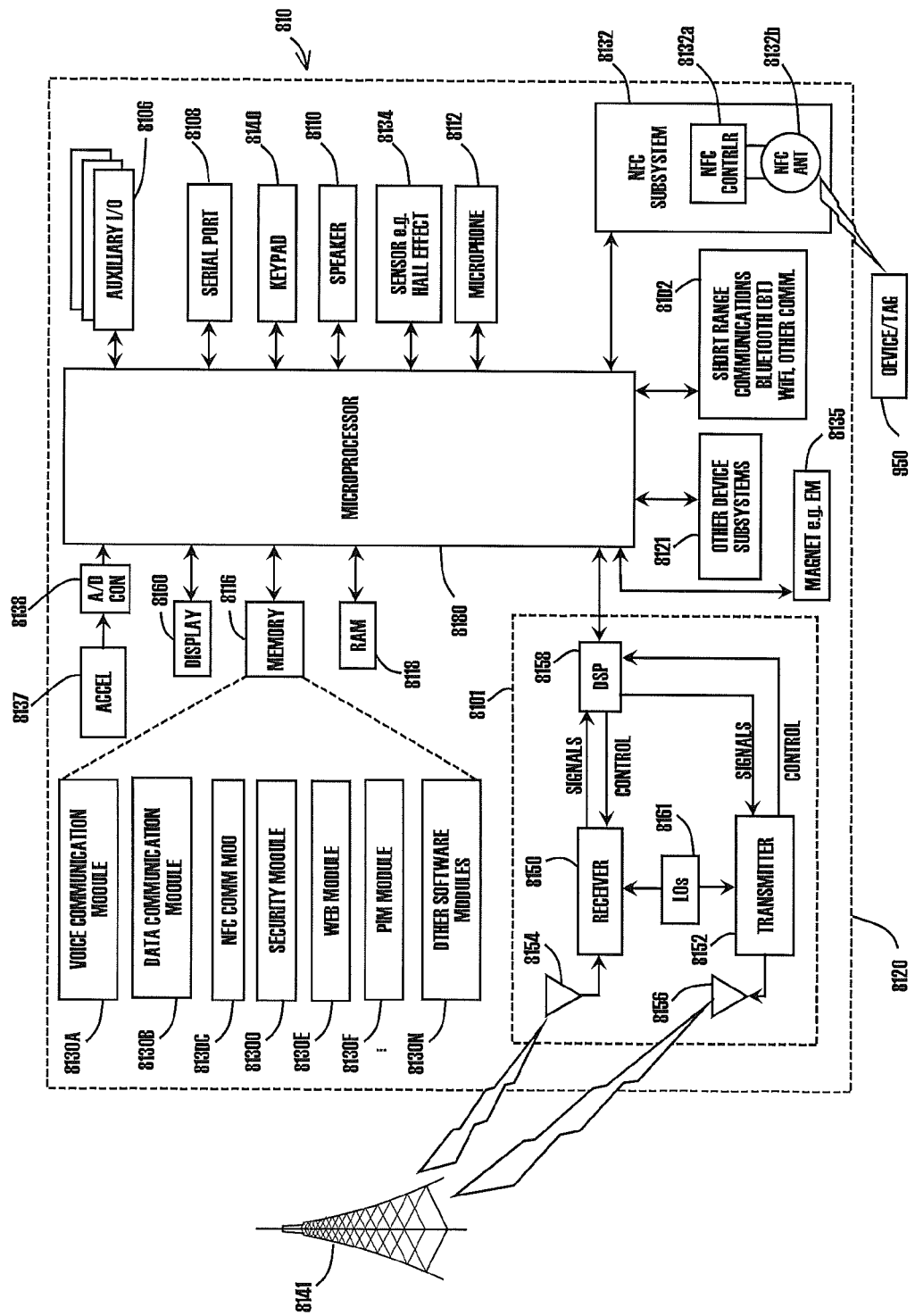
FIG. 8 illustrates aspects of an NFC capable device in accordance with an exemplary embodiment of the present disclosure.

A non-limiting example of various functional components that may be used in the exemplary mobile wireless communications device 810 is further described in the example below with reference to FIG. 8. Device 810 illustratively includes a housing 8120, a keypad 8140, inputs 8106, 8108, 8112, and outputs, such as output 8106, display 8160 and speaker 8110. The output 8160 may comprise a display, which may comprise a full graphic LCD, and/or may be touch sensitive as an input device. If the display is a touch-activated display, the keypad 8140 may not be necessary. Other types of output devices may alternatively be used.

A processor 8180, which may apply the specialized algorithms discussed throughout, and/or which may operate in conjunction with a specialized processor (not shown) in applying the algorithms, is contained within the housing 8120 and may be coupled between the keypad 8140, other inputs 8106, 8108, 8112, and outputs, such as outputs 8106, 8110 and display 8160. This processor 8180 is typically a microprocessor chip contained on a circuit board in the housing 8120. The processing device 8180 controls the operation of the display 8160, as well as the overall operation of the mobile device 810, in response to received information and inputs, such as in response to actuation of keys on the keypad 8140 by the user.

In addition to the processing device 8180, mobile device 810 includes a wireless communications subsystem 8101 comprising a transmitter 8152 and general antenna 8156, receiver 8150 and general antenna 8154, and digital signal processor (DSP) 8158; a short-range communications subsystem 8102, which may or may not have dedicated antenna systems for short-range aspects; specialized memory device 8116, memory device 8118 and various other device subsystems 8121. The mobile device 810 is, in this example, a two-way RF communications device having voice and data communications capabilities using RF circuitry. In addition, the mobile device 810 has the capability to communicate with other computer systems via the Internet. For example, device 810 may communicate with one or more servers such as Internet servers via RF subsystems 8101 and the associated components, including web module 8130*e*, and further via the short-range communications subsystem 8102, such as via web module 8130*e*. System 8102 includes, for example, a Bluetooth communications module for establishing a Bluetooth wireless connection, and other communications modules, such as an infrared modules or devices, WiFi circuits and modules, and associated components and circuits that may also form part of the RF circuitry.

Operating system software executed by the processing device 8180 may be stored in a persistent store, such as the memory 8116, or may be stored in other types of memory devices, such as a read only memory (ROM) or similar storage element. In addition, system software, specific device applications, or parts thereof, may be temporarily loaded into a volatile store, such as the random access memory (RAM) 8118. Communications signals received by the mobile device may also be stored in the RAM 8118, and data received, such as for an application, the operating system, etc., may be stored in memory 8116.

The processing device 8180, in addition to its operating system functions, may enable execution of software applications and modules 8130A-8130N stored at least partially on the device 810. A predetermined set of applications that control basic device operations, such as data and voice communications 8130A and 8130B, may be installed on the device 810 during manufacture. A Near Field Communications module 8130C is also installed as illustrated. Further, application modules may include native and non-native modules for security 8130D, Web interaction 8130E, social interactions or applications, and the like.

The NFC communications module 8130C, as a software module, may cooperate with NFC controller (which may itself include hardware, software, and firmware) 8132*a* and with the microprocessor 8180, such as through the memory 8116. Additionally, NFC communications module may, in embodiments, provide the responsive operability to tag reads/writes, whether virtual or physical, by interacting with other modules and apps to effect tag data, and/or to obtain or write tag data. Such other modules may particularly include web module 8130E, PIM module 8130F, and other software modules 8130N (such as apps and video players, by way of non-limiting example). The microprocessor 8180 may also cooperate with the NFC module 8130*c* (which may include the smart tag application discussed hereinthroughout), and with the NFC subsystem 8132, which may include an NFC chip or chips that comprise NFC controller 8132*a* and antenna 8132*b* that may communicate with another device or tag 950, as discussed herein. The NFC communications module 8130C may allow the microprocessor to control the NFC subsystem 8132, which may be tuned to about 13.56 MHz, and/or the display 8160 and memory stores 8116, 8118.

The NFC chip may be, for example, a PN531 microcontroller-based transmission module from the Phillips Semiconductor Branch of Koninklijke Phillips Electronics N.V. When the NFC chip is a PN531 module, the NFC chip 8132*a* may include analog circuitry and a contact list Universal Asynchronous Receiver Transmitter (UART), a core and a set of host interfaces. The analog circuitry may include an output driver, an integrated demodulator, a bit decoder, a mode detector and an RF-level detector. The contact list UART may include elements for data processing, Cyclical Redundancy Checking (CRC), parity generation, framing generation and check bit coding and decoding. The core typically includes an 80C51 microcontroller, 32 Kbyte of ROM and one Kbyte of RAM. A set of host interfaces may interface with the microprocessor and interface according to such known standards as I2C, serial UART, SPI and USB.

There is also illustrated a magnetic sensor 8134 that may act as a Hall Effect sensor and that may be communicatively connected to the microprocessor 8180. It includes the various components that operate as a Hall Effect sensor, including any necessary coils or other circuits. There is also illustrated a magnet 8135 that, in one exemplary implementation, is formed as an electromagnet and operates with the microprocessor 8180 to allow a different communications pathway using electromagnetic energy that is changed to correspond to changing data. Thus, although the electromagnet 8135 operates similarly to other magnets in the mobile wireless communications devices in FIG. 4 and FIG. 9, it may operate, in one example, to form another communications protocol pathway. This electromagnet 8135 may have a plurality of different functions, including working as an active or passive device in association with other components of the device 810, as illustrated. For example, when the electromagnet 8135 is used in place of an installed magnet (non-electromagnetic) in the devices of FIG. 7, a pulse of energy is delivered to the Hall Effect sensor in the other device. The other device receiving the pulse may accordingly activate the NFC circuit. A WiFi connection, for example, in the alternative may be established if an NFC and/or Bluetooth connection is not established. Other software modules 8130N may include, for example, software that interoperates with the magnetic sensor 8134 and any magnet or electromagnet 8135 or other magnetic circuitry that are included within the overall electromagnet 8135.

Figure 9:
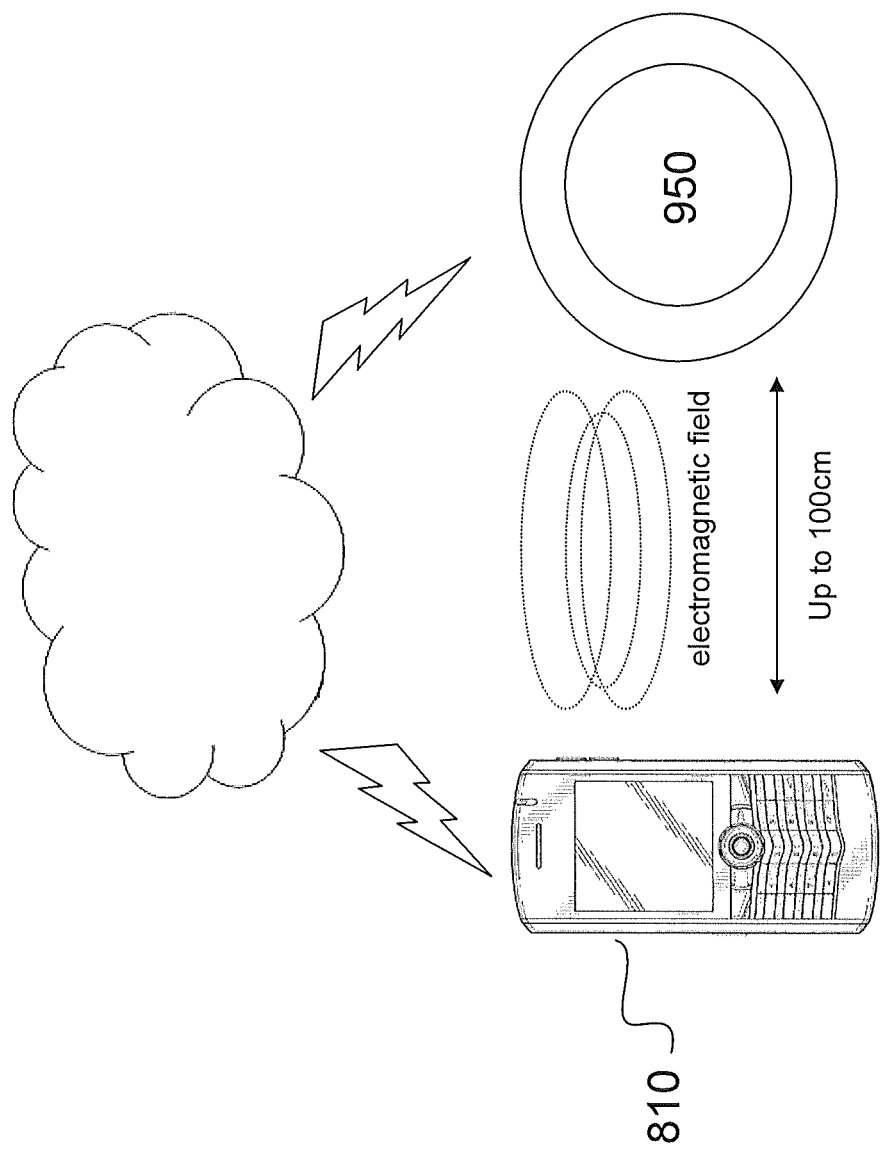
FIG. 9 illustrates communication aspects involving an NFC capable device in accordance with an exemplary embodiment of the present disclosure.

An accelerometer 8137 and an analog/digital converter 8138 may be connected to the microprocessor 8180 as illustrated, and may allow another implementation of the NFC automatic tag detection (and automatic peer-to-peer detection). The accelerometer 8137 recognizes the tapping of a communications device against a tag or another device, thus recognizing at least one vibration. Instead of using the Hall Effect sensors and magnets to wake up the NFC circuit, the circuit uses tap recognition, for example, in the form of a vibration sensor and accelerometer in this example. It should be understood that when the device is tapped against another object, for example, an NFC tag as illustrated in FIG. 9, a profile is generated as a matter of certain accelerometer parameters being met or exceeded. If the profile is compared against a known tap profile, it will wake the NFC circuit and initiate communication. In other embodiments, the accelerometer may be part of a motion sensor system, and other motion sensor systems other than an accelerometer may be used such as a cadence sensor or cadence detection system.

In addition, a personal information manager (PIM) application module 8130F may be or include a native module installed during manufacture. The PIM is capable of organizing and managing data items, such as email, contacts, calendar events, voice mails, appointments, and task items. The PIM application is also capable of sending and receiving data items via a wireless network. The PIM data items are seamlessly integrated, synchronized and updated via the wireless network with the device user's corresponding data items, such as may be stored in the cloud or as may be associated with a host computer system, for example.

Communication functions, including data and voice communications, may be performed through the communications subsystem 8101, and/or through the short-range communications subsystem 8102, which may be part of the circuitry contained in device 810. The specific design and implementation of the communications subsystems 8101 and 8102 is dependent upon the communications network in which the mobile device 810 is intended to operate.

The communication functions may, as referenced above, be carried out by data module 8130b, voice module 8130a, and web module 8130d, including at the instruction of NFC module 8130c in accordance with the disclosed embodiments, with security for these communications, such as in the granting of access to PIM module 8130f, overseen by security module 8130d. As such, security module 8130d may include one or more native or non-native security applications, including anti-virus/anti-malware applications or functions, and protection of PIM information via applications or functions, during external interactions, may occur via NFC or via the Web, for example. Accordingly, security module 8130d may allow for degrees of security in interacting with other devices, such as the aforementioned tags, and/or other devices such as servers (herein defined to include any device acting as an Internet, intranet, extranet, or other public or private network node, host, server, or the like), and particularly with devices or aspects of a device that enable the occurrence of communication exchanges by the device occur over a network, such as the Internet.

Figure 10:
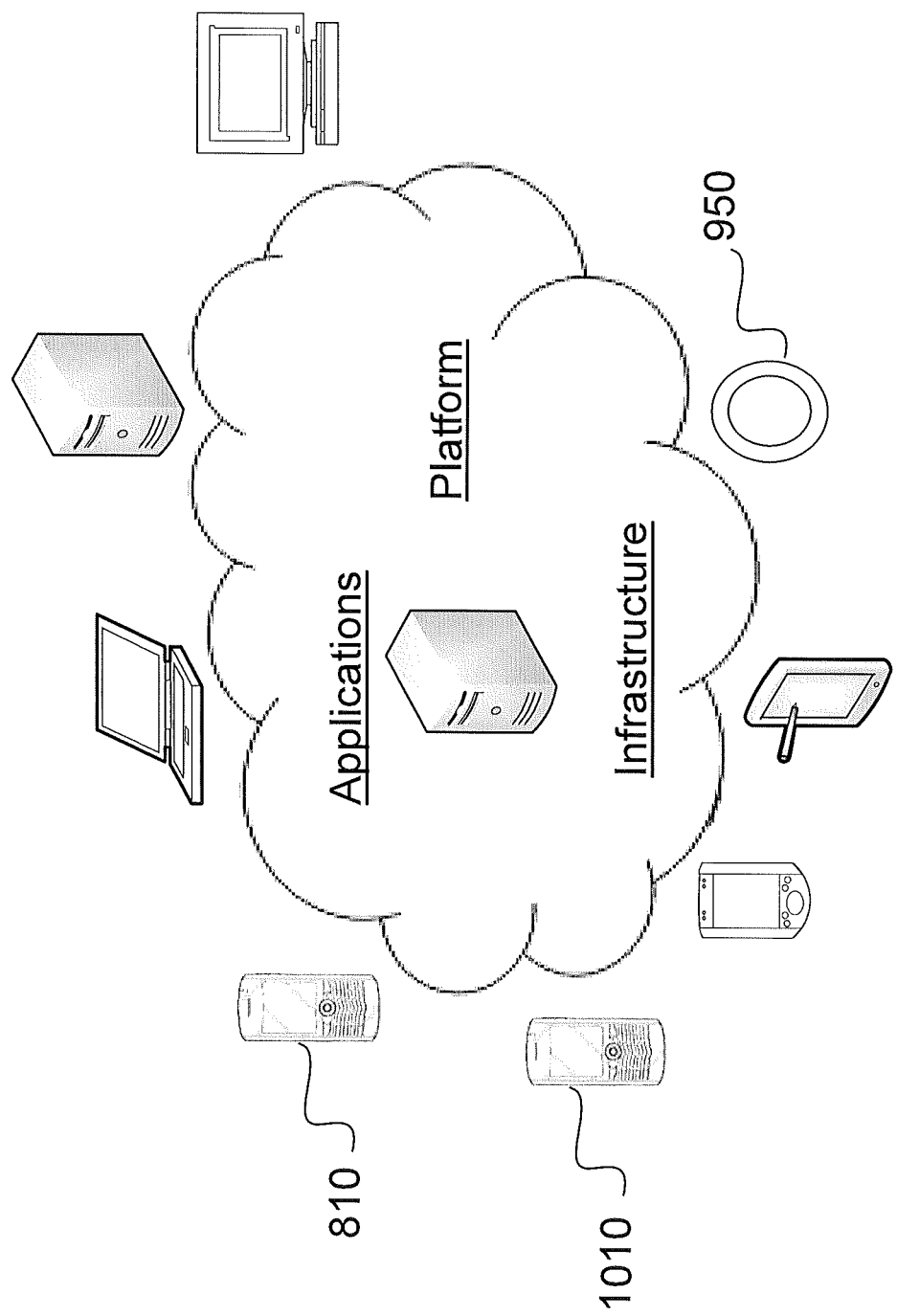
FIG. 10 illustrates server aspects accordance with an exemplary embodiment of the present disclosure.

A server architecture is illustratively shown in FIG. 10 and may include an infrastructure model which may place fault tolerance concerns within a software layer to provide, among other things, load balancing both internal and external to the cloud, thus allowing for more intelligent resource allocation, and a reduction in hardware needs, which may reduce costs and downtime issues, and which may increase communication efficiencies (including the speed of communication). In general, the provisioning of a server may include at least one node server running at least one Cloud OS, for example. Through access as described herein, devices such as, for example, laptops, servers, desktops, active ones of tags 950, tablets, mobile devices 1010, and device 810, may communicate with the at least one node server to obtain information/data as may be indicated by the device NFC module 8130C, and/or as may be indicated to the NFC communications module 8130C by a tag 950 or by another mobile device. The server may include applications for such things as, for example, monitoring systems (for both content and service), content, collaboration, security modules, communications modules, and/or at least aspects of native/non-native applications. The server architecture may also include the provisioning of at least one of the following resources: database, queue, runtime, identity and object storage, for example. Further still, and as discussed herein, a server may include infrastructure including, for example, at least one of the following: a processor, block storage, a network and a node server.

In embodiments discussed herein, and as illustrated above with respect to FIG. 9, a physical NFC tag may be read by a reader device (also referred to herein as a "reader"), and/or written to by a writing device. The device may read or write data or information from or to the NFC tag, wherein the data or information may typically not include large volume data or information. A reader device may react accordingly based, at least in part, on information resident on the NFC tag. Further, a device may similarly read from or write to a virtual tag internal to the device, and/or may read from or write to a NFC communications module on another mobile device, such as via a camera-read of a bar code by the other device, or the like.

Figure 11:
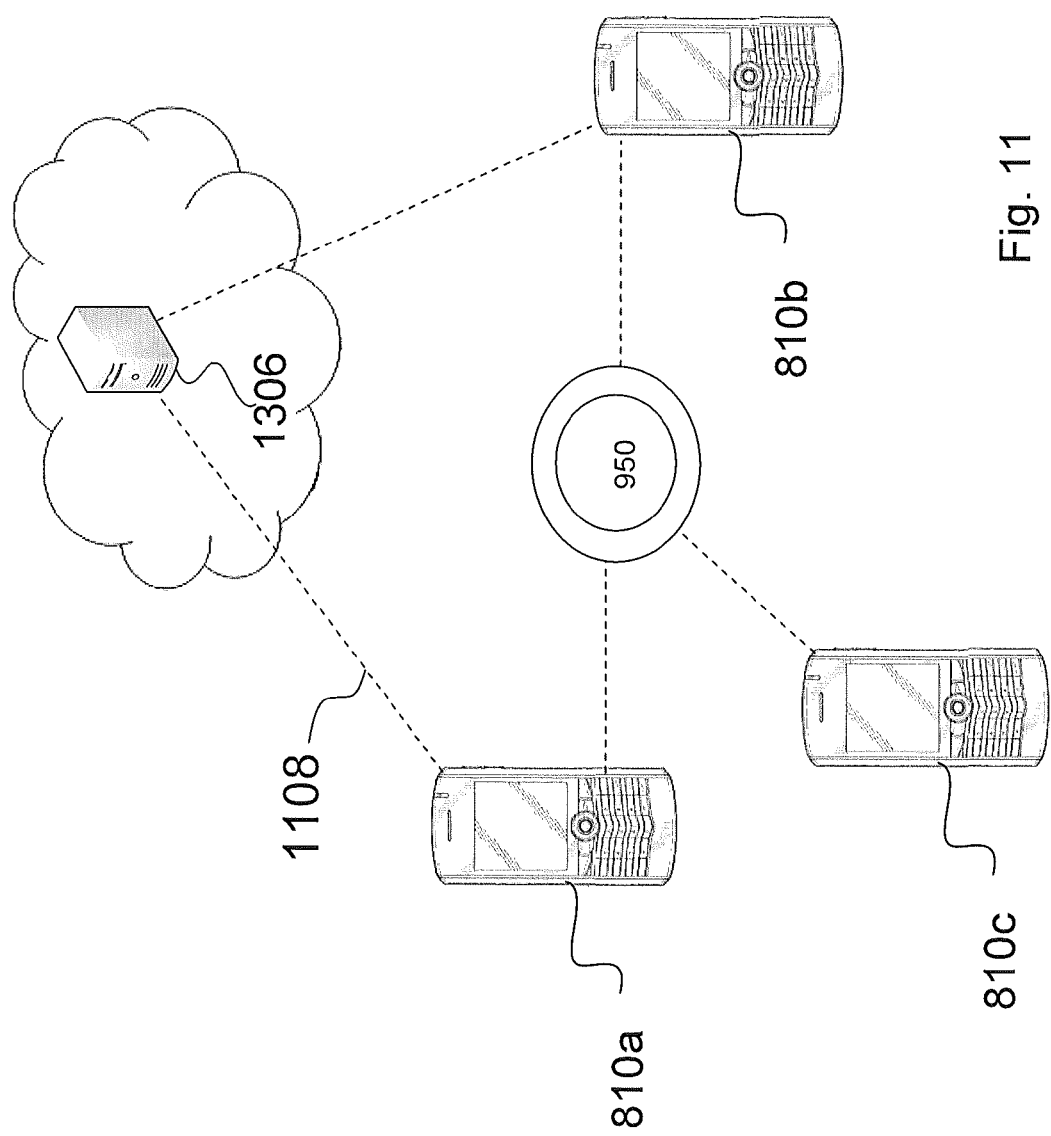
FIG. 11 illustrates communication aspects involving NFC capable devices in accordance with an exemplary embodiment of the present disclosure.

In FIG. 11, illustrated is a schematic network diagram showing a network that may include a plurality of mobile devices 810a, 810b, 810c, at least one NFC tag 950, and a communicative connection indicated by a physical or virtual tag from at least two of the reading devices 810a, 810b to at least one server 1306. The mobile devices of FIG. 11 may be any mobile devices known to those skilled in the art, such as those discussed above, and particularly, by way of non-limiting example, the Blackberry Bold 9900.

More particularly, and as illustrated in the network diagram of FIG. 11, a device 810c may interact with the NFC tag 950, and may obtain therefrom information and data. For example, the device may read the limited data resident on NFC tag 950, and may be pointed thereby to a server 1306 having associated therewith richer information and data assets. For example, high volume data may thus be delivered from NFC tag 950 to reading devices 810a, 810b, such as via communicative link 1108 from the server to a reader device. Such a pointer for high volume data may be, for example, a URL, i.e., an Internet Protocol (IP) address or a like data link.

The disclosed embodiments may be operable using active or passive NFC tags. As used herein, an active tag is an NFC tag capable of operating pursuant to its own power. Conversely, a passive tag is one that operates responsive to the providing of an electric field from a reader device. Further, for the purposes of the instant discussion, tags may also be switchable between active and passive, such as responsive to the presence of a particular reader in proximity to the tag.

Moreover, tags, as used herein, may include physical NFC tags and virtual tags (hereinafter also collectively referred to as "tags"), which virtual tags may reside within a device and which, although not necessarily read from or written to a physical NFC tag, may be treated by the device as a read from or write to an NFC tag. That is, a virtual tag is a tag that may be organically read or written internal to the device, or that may result from the reading of a physical tag, or that may be intended to ultimately be written to a physical tag. For example, although a virtual NFC tag may not interact with NFC Subsystem 8132 in FIG. 8, the actions undertaken in accordance with the data and information read from or written to a virtual NFC tag may interact with, or cause interaction with, the remaining elements and systems of device 810 of FIG. 8 in the same manner as would be effectuated by a read from or write to a physical NFC tag, including interacting with NFC module 8130c, and with other modules out inputs/outputs of device 810 at the direction of NFC module 8130c.

Further, the NFC tag 950 in the exemplary embodiments may be any tag known to those skilled in the art, including but not limited to NFC tags, radio frequency identification ("RF ID") tags, 2D barcode tags, 3D barcode tags, QR code tags, holographic tags, or the like, that are capable of being read by a reading device. Accordingly, in particular exemplary embodiments and where noted herein, tags may also include one or more of the foregoing when provided from one mobile device to another, such as in the embodiments of FIGS. 4 and 7, and as discussed further below.

By way of non-limiting example, and as referenced above, mobile device 810 includes NFC transceiver module 1832, and an associated application or applications 8130A-N, including NFC communications module 8130C, suitable for interactions with physical or virtual smart-tags, smart accessories, and other NFC enabled devices. That is, an NFC smart tag application(s) may form part of NFC communications module and may interact externally to device 810, such as through the afore-discussed NFC transceiver subsystem 8132, with one or more tags, and may interact internally to device 810, such as via microprocessor 8180, with other aspects and modules of device 810.

By way of non-limiting example, certain Blackberry® devices from Research in Motion Limited of Ontario, Canada, are equipped with an embedded, native Smart Tag application suitable for obtaining the small amounts of data typically stored in an NFC tag, such as in conjunction with the data of the tag being stored in a memory 8116, 8118, wherein the Smart Tag application (i.e., NFC module 8130C) may provide for display on the device display 8160 of certain of the data that is read/written/stored in relation to the tag. As used herein, a native application is, as would be understood by those skilled in the art, an application designed for use on a particular device or platform. Further, an embedded application, as used herein and as would be understood by those skilled in the art, is an application embedded in the operating system for a particular device or platform. Although certain of the examples discussed herein may be made in reference to embedded and/or native tag reading and display applications, those skilled in the art will appreciate in light of the disclosure, that the embodiments described may similarly be employed with non-native and/or non-embedded NFC reading and display applications.

The data or information stored and/or displayed by the tag application(s) may include, as discussed throughout, information suitable to create and display a categorization/log of tags read and/or written, and/or a categorization/log of the reference point and/or channel indicated by the tag information/data that is read or written. In an example introduced hereinabove, a Bluetooth speaker system may have a smart-tag associated therewith that contains Bluetooth pairing information. The NFC tag reading application may detect the smart-tag in the Bluetooth system via the NFC subsystem 8132, and may indicate via the display to the user that pairing has been initiated, whereafter the mobile device's audio output may be sent to the Bluetooth speakers. Further, the pairing information, or a pointer to the pairing information if stored on a remote server (such as in the cloud), may be stored in a categorized log of tags read, such as for subsequent display to the user. Accordingly, at a future time, the user may select the data for that tag, which has been stored, and perform the pairing anew, without need to re-read the tag. This may be advantageous at least because physical NFC tags are typically designed to transfer small amounts of data over short distances from the tag to the mobile device, physical tags may be limited to transmitting data such as the discussed Bluetooth pairing information, a web address wherefrom a user may retrieve additional information, such as may be indicated from a smart poster tag, geo-location information, contact information, and/or identification information, such as for a smart-dock.

Data transfer from an NFC tag may be limited in size and transfer rate, for example due to the limitations of the NFC tag's transmitter and the NFC tag's storage capability in comparison with, for example, common Bluetooth or WiFi devices. Consequently, the embedding of rich media, such as images, video, and the like on standard physical NFC tags may be inefficient, impractical, or even impossible. Accordingly, the simultaneous display of a variety of different tag reads and writes performed by a mobile device's NFC tag application may be of limited use.

However, the NFC module 8130C may allow for separation, categorization, and logging, such as for display 8160, of downloaded information and data. This enhances the usefulness of storing tag reads and writes for later use no longer in proximity to the physical tag. Such an NFC module 8130C (which may operate, for example, in conjunction with a tag logging application and/or other applications and modules 8130N) may, for example, visually divide and categorize/log the read or written tag information, and may include information stored at a location identified by a tag pointer, for example, comprising rich visual assets, such as large images, videos, games, streaming, and the like, including information that is targeted for presentation by other instantiated applications, such as video players or third party gaming apps. Conversely, the categorized and/or logged tag information may simply be the information that was conveyed to or from the tag itself, i.e., simple data and/or small data assets typical of NFC tag transactions, such as contact information, pricing, phone numbers, or the like.

As such, in some embodiments, the NFC module 8130C may direct storage of tag data and information (e.g., comprising simple tag data assets and/or pointers/indicators from a tag of large data assets not suitable for storage on a physical tag) in an internal tag log record that may point to the storage location of data assets for retrieval by a smart tag application. The tag log may thus point to local, on-device storage for certain data assets, and/or may point to addressing stored internally that leads to rich data assets stored remotely.

The logged assets may be displayed to the user in an easily recognizable format, such as by file folders, image tiles, color coding, recognizable icons for tag type, combinations thereof or the like. Thereby, the user may select a desired asset from the log stored on the device, without rescanning any physical tags associated with the logged tag. The NFC module 8130C may then execute, or cause the execution of, device actions responsive to the information that was read from the tag and logged.

For example, a "smart" movie poster containing an NFC tag promoting a movie, such as "The Descendants" by way of non-limiting example, may point to an official movie site, such as http://www.foxsearchlight/thedescendants/. A moviegoer may scan the poster tag with his or her mobile device, which may respond by launching a web browser and accessing the movie site and the large, rich data assets associated with the movie that are stored at that address. Thereby, the moviegoer may easily access trailers, presentation posters, movie stills, reviews, actor biographies, and the like. Thereafter, the user's mobile device may store, such as in an on-board virtual tag, the foregoing address, and may present to the user, such as in a tile format, a link to The Descendants movie website. For example, the tile may have a thumbnail picture associated therewith, such as may have been displayed as a Fox Search Light upon reading the physical tag, or as may have been conveyed to the device upon accessing the web address designated by the physical tag. The thumbnail picture may be, for example, a movie still with associated text indicating the movie title, so that the user may later simply and intuitively select the tile to gain access to the rich media regarding the movie, without having to access the physical smart poster tag. Pursuant to the user selecting the movie tile, the mobile device may be directed to the foregoing web address, and may download, stream, or otherwise view the associated large assets without having had to download those large assets from the web address obtained from the physical NFC tag upon the initial read. In other words, at the application presentation layer, the data acquired from the NFC tag may be combined with rich or simple presentation data in a seamless and automatic fashion for later selection and display by the user.

Thus, all tags that have been read/created by a device may be displayed to a user, such as in a categorized log, for ready access by the user to obtain the data associated with the tag, or to be directed to a remote location to obtain the data associated with the tag. Tags may be organized by default or selectively sorted, for example, based on particular categories, search features, content, creator, or the like. For example, tag content may be color coded, such as wherein phone numbers are displayed under a green category, web-links and locations in a purple category, applications in a blue category, and so on. Such categorization may be done on-line or off-line, wherein off-line occurs without cellular coverage.

Figure 12:
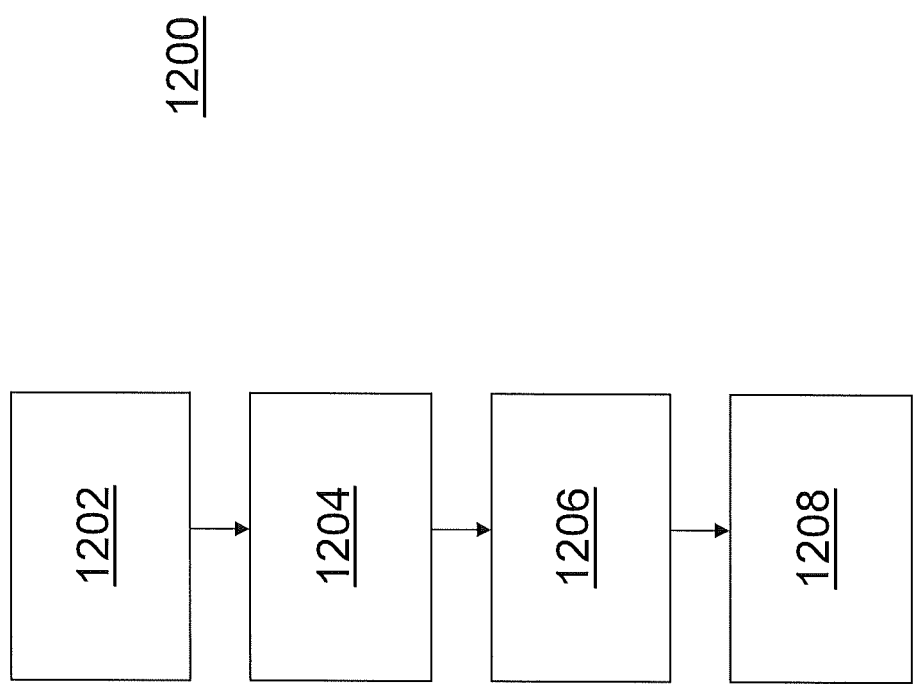
FIG. 12 illustrates a method in accordance with an exemplary embodiment of the present disclosure.

FIG. 12 is a flow diagram illustrating a method 1200 of characterizing tags according to the foregoing exemplary embodiments. As illustrated, at step 1202 a physical tag may be read or written. At step 1204, information regarding the tag, such as its tag type or content, may be discerned, such as by reference to the aforementioned NDEF formatting (i.e., by reviewing the overhead information associated with the data) or by parsing (i.e., by reviewing the payload information associated with the data). At step 1206, the discerned information may be used to log, categorize, and store the tag, such as into a particular category. The log may indicate, for example, a type of the tag data (i.e., text, audio, still picture, video, geo-location lat/long, web address, remote or local, etc.), the content of the tag data (i.e., a game, a movie, contact information, etc.), the formatting of the data, the file size of the assets associated with the tag, the creator of the tag and/or of the data assets, commonality of one or more search features with other tags, or the like.

At step 1208, the logged data may be categorically presented to the user on a device display in a manner indicative of the category and/or content of the tag. By way of non-limiting example, video tags may be one color, phone tags another; or video tags may have associated therewith a film icon, and phone or contacts tags may have associated therewith a telephone handset icon; or games may all be placed in a folder together labeled "Games," or all games by the same creator may be placed together in a folder labeled with the name of the creator, or labeled with mini-thumbnails of still images from one or multiple or all games in the folder.

In such categorization embodiments, algorithms may be employed for detecting and interpreting tag categories and types. Standard format reads, such as using the NDEF standard formatting, may be employed to identify data record types in text, overhead, meta tags, or the like, among others. For example, the TNF field value may be employed to indicate the structure of the value of the data type for the data associated with a tag. The TNF field may be, for example, the standard NDEF 3 bit field with values defined in accordance with said NDEF specification. As referenced above, the type may be indicative of a category, which category may be indicated by color coding, icons, such as wherein a telephone icon indicates a phone number data read from an NFC tag, pictures, audio, or the like that is associated with the tag data, text or file folder indicators, or combinations thereof, by way of non-limiting example.

Additionally and alternatively, the NFC data may be parsed to determine the type or content of the data, such as to allow for placement of the data into a display category. Whether the tag data is categorized based on the TNF field, or by parsing, categorization of the tag may allow for sorting or searching of tags, grouping of tags together, such as in a file folder, such as based on information regarding the tag data, and the like.

In some embodiments, tag data may include a location, such as, for example, a URL or location in storage external to the device, that may contain presentation information which may be used to represent the tag to the user. For example, the presentation information may include a thumbnail or other image. In other words, in some embodiments, tag data may include one or more data items, such as a phone number, location, etc. as discussed above and an additional data item specifying a location from which presentation information may be retrieved.

In some embodiments, the grouping of tags could be done for movements in and out of buildings, banking transactions, and displayed for example in places other than the NFC tag application (e.g. the inbox, a banking or location application that tracks user activity). In that and other grouping examples, a "dynamic placeholder" could be used that is representative of the last tag read (showing info such as date, time, transaction type, location, etc.). The placeholder could be dynamically updated with the last tag action (or transaction/location logged).

In an embodiment relevant to a personal access/banking application, an NFC-enabled mobile electronic device may be used for personnel access (i.e. to access a secure location, such as a building). For example, the device may communicate a security code to an NFC-equipped security controller located outside of a building. The security code can include a series of alphanumeric characters, and in some embodiments the security code may be encrypted to provide enhanced security. The security controller may grant personnel access if the security code is valid, and denies personnel access if the security code is invalid. In this embodiment, the device may store a log of all NFC interactions with personnel access systems. These logs can be categorized and displayed under a 'personnel access' category.

In another embodiment, the device may be used for payments. For example, the device may communicate a credit card number to an NFC-equipped point-of-sale terminal in a store. The purchase is approved if the credit card is valid and there is sufficient credit available. Alternatively, a debit card may be used, and the purchase may be approved if there are sufficient funds in the account. In this embodiment, the device may store a log of all NFC interactions with point-of-sale terminals. These logs can be categorized and displayed under a 'purchases' category.

In some embodiments, categorized NFC-related interactions of the mobile device can be displayed in applications other than the NFC application. For example, NFC interactions under the 'purchases' category can be displayed in a money management application; NFC interactions under the 'personnel access' category can be displayed in a travel application; or all NFC interactions can be categorically displayed in a unified inbox application, for example.

Figure 13:
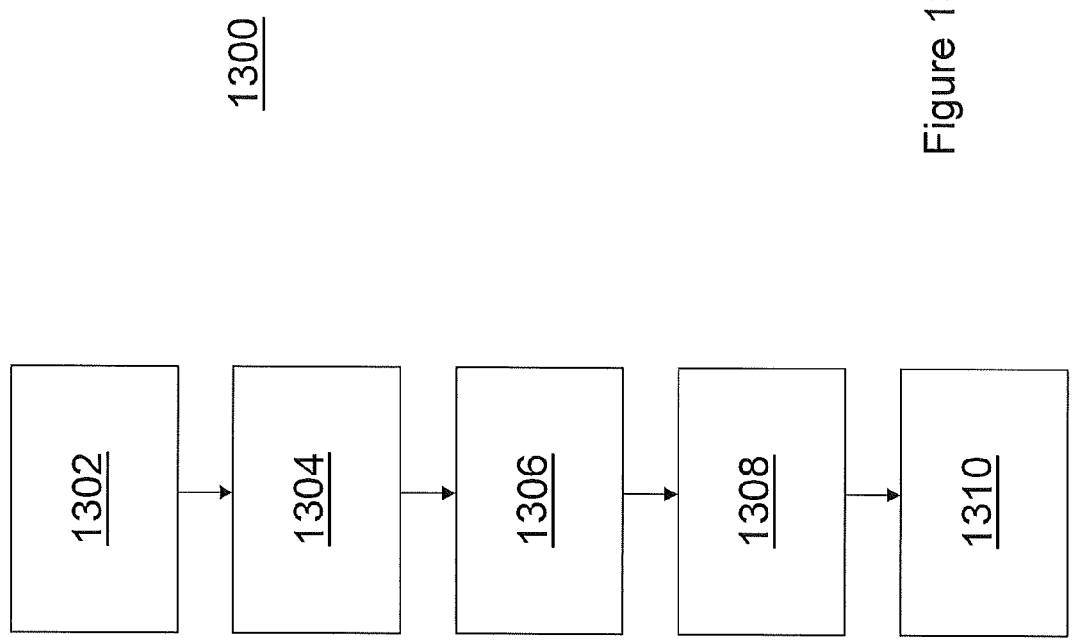
FIG. 13 illustrates a method in accordance with an exemplary embodiment of the present disclosure.

FIG. 13 is a flow diagram illustrating an exemplary embodiment of a method 1300 of parsing tag data for categorization and display on a device. For example, and as illustrated in FIG. 13, in a parsing embodiment the tag data may be received and logged, including overhead and payload portions of the data, at step 1302. The payload information received from the tag may be parsed to determine its data type, or, the data at an address pointed to by the tag data may be parsed to determine its data type, at step 1304. For example, the parser may identify specific text strings, markers, or the like in the payload or referenced data, and use a lookup table to determine the data type. Based on the type of data, the appropriate category for the content and/or type of the item may be determined at step 1306. The logged information may be displayed to the user at step 1308. Further, the payload information may also optionally be displayed at step 1310. For example, if the received payload is location data, then the reading device may categorize the received information in the geo-location category (step 1306), may display, for example, a tile, icon or folder indicative of the information in category (step 1308), and may retrieve and display a map of the indicated location (step 1310).

In an additional example, if the received data is a web page address, then the device may retrieve the web page, and may parse and display the web page, as well as associating the web page with the proper category as parsed in a thumbnail format, wherein subsequent accessing of the thumbnail on the display indicates the device to open the web browser and surf to the correspondent page that was indicated by the by the tag. For example, a thumbnail service may be used to obtain graphics to represent a website URL, a Google Maps picture may be used to represent a particular location, a brand trademark or icon of an application may be used if the parsed data suggests that the tag directs to an application or type of application, a picture of a particular person may be fetched if the suggested category is contacts/email/phone (the picture may be, for example, from either from the present device contacts or from a social network), the first frame or title frame of a video from YouTube or a theatrical release may be fetched and displayed as a framed icon, and so on.

Figure 14:
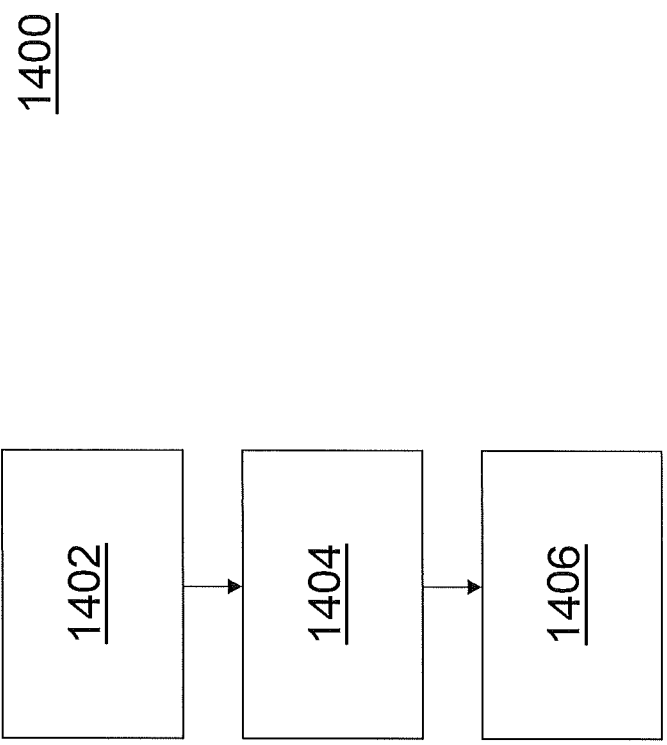
FIG. 14 illustrates a method in accordance with an exemplary embodiment of the present disclosure.

More particularly, when the user accesses the representation of the NFC tag data, such as by selecting, touching, or the like, the NFC smart-tag application/NFC module 8130C may invoke an included or associated application handler that assesses and launches the appropriate other application (such as a video player) 8130N to manipulate/display the content associated with the tag data. Those skilled in the art may recognize, in light of the discussion herein, that a user may wish to share the data from a tag. In such embodiments, and as illustrated with respect to FIG. 14, in a sharing method 1400 the user may be enabled to select, such as from categories and/or via search, a particular item, such as based on the displayed icon of that item (or those items, if a group is selected), at step 1402. Thereafter, the user may indicate, such as by selection from a menu associated with the selected item, that an externally readable indicator, such as a barcode, be displayed in association with the selected item, at step 1404. The displayed indicator may allow a second user device to use a barcode reading application to read the indicator/barcode at step 1406, and accordingly obtain the same information known to the original user's device from the underlying tag.

Figure 15:
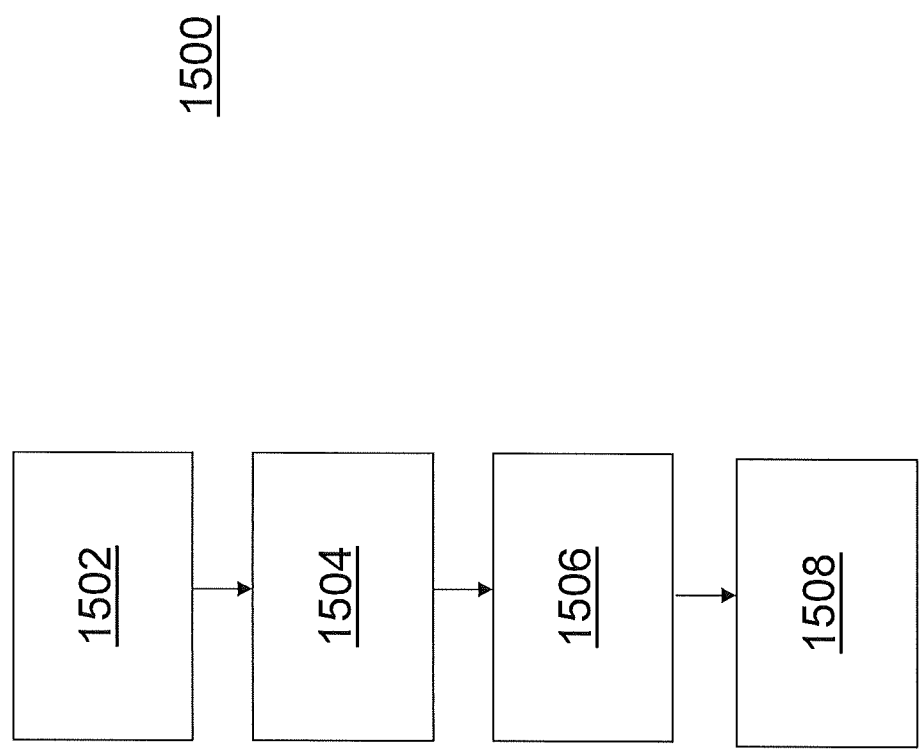
FIG. 15 illustrates a method in accordance with an exemplary embodiment of the present disclosure.

As referenced above, irrespective of the manner of categorization of tag information, it may be preferable that like tag data/content be grouped together, such as in a folder. A method 1500 of grouping is illustrated in FIG. 15. In such embodiments, tags and/or tag data may be grouped based on a particular factor or factors at step 1502, such as having been read from a single NFC tag, as having been written to the same tag, as being indicative of the same data source and/or creator, as being of the same data type, such as all games, as being "favorites" or frequently used, as having the same or similar content, or the like. Once grouped, the items may be displayed as a group at step 1504, such as in a folder, all on the same tiled page, or the like. Further, the group may receive a category coding, such as a particular icon or color as discussed above, to indicate the common factor that binds the group, at step 1506. Accordingly, certain operations, such as the sending of the data items, or the making available to second users such as via a barcode read, may be performed on an entire group simultaneously at step 1508. For example, upon reading an NFC tag, the reading device may receive a phone number, a location, and a web address of a particular restaurant. These three data items may then be displayed categorically together as a group using a single folder icon, based on the fact that the three data items were read from the same NFC tag.

In an embodiment, when a group folder item is tapped, all records within the group may be displayed separately, such as being displayed as independent tiles on the same display page. For example, a game tag folder may have several different games associated in it. Accessing the game tag folder may accordingly display a group of all of the games with that game tag indicator. In an additional example, a hotel tag may provide a phone number, a location, and a website address, all of which may be displayed as a group within a folder indicative of that hotel. As would be appreciated by the skilled artisan, the aforementioned NDEF standard includes multiple indicator fields that may readily allow for this categorization of items having certain individual fields together into a group for display, such as for display within the same folder. Likewise, groups may be created using data parsing, as discussed above.

In an exemplary embodiment, a plurality of interactions may be available for execution by the smart-tag application(s) 8130C. For example, the application may permit a user to retain a log of physical and virtual tags read and written, which log may include data from a tag, or pointers to data/content obtainable based on the data from a tag. Likewise, a log may be maintained for QR codes or barcodes read/written by the device, which log may be maintained in the same manner as a tag log, and as discussed hereinthroughout.

Further, the smart-tag application/NFC module 8130C may allow a user to create tags, such as a tag having data associated therewith of type of URL, email, SMS, text, phone, application (such as app world applications for Blackberry), and geo location, by way of non-limiting example. Tags thus created may be placed in the tag log. The smart tag application 8130C may interface with NFC subsystem 8132 to allow a user device to write a logged tag to a physical tag. Moreover, a logged tag may be marked as a favorite and/or may be searchable, which may allow for quick filtering of the tag log. Additionally, the smart tag application 8130C may allow for the locking of a physical tag, which locking may prevent further writing to the tag (such locking may be reversible or irreversible). Yet further, a smart-tag application may allow a user to share content to a tag, or to share content with other device users.

Figure 16:
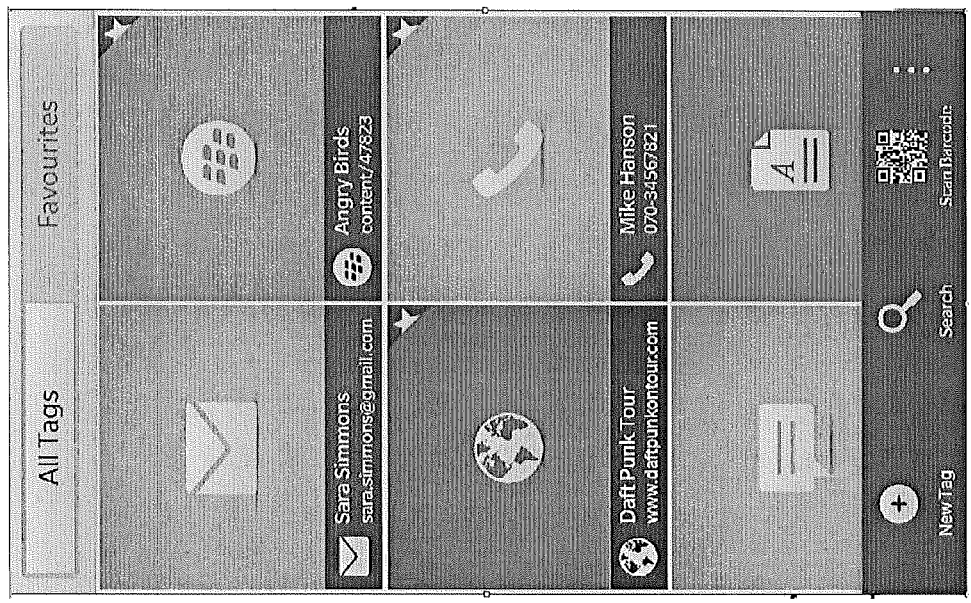
FIG. 16 illustrates a device display having display and selectable features in accordance with an exemplary embodiment of the present disclosure.

For example, and as illustrated in the screen shot of FIG. 16, the tag log may display tags, such as may be displayed by categories, on the display output 8160 of device 810. Such a display may include, for example, a segmented header, which may allow a user to switch between all tags, certain categories of tags, favorite tags, and the like. Each tag may include information regarding the tag. For example, each tag may reference the title of the tag, the content of the tag (email, URL, or the like), and/or may include a standard icon for that type of tag for inclusion in the log. Tagged data that does not have corresponding category information, such as tag data that is lacking an icon, may be displayed using a place holder, such as if no image is available.

Further, and as shown in FIG. 16, a user may be enabled to create a new tag from a base display within smart tag application 8130C, which new tag may be added to the tag list, and/or which later may be used to create a new physical tag using NFC subsystem 8132. Yet further, and as also shown in FIG. 16, the user may be enabled to search for particular tags, categories, or the like. The search feature may follow standard in-app search, as will be apparent to those skilled in the art.

Additionally, and as shown in FIG. 16, a user may be enabled to scan or display a barcode, such as to allow for the sharing of tags as discussed above with respect to FIG. 14 and as shown in the exemplary device interactions of FIGS. 4 and 7. For example, actuation of the scanned barcode feature may allow the user to select a tag, whereupon the barcode indicative of that tag's data may be displayed on the user's device. Thereafter, a second user may invoke a camera viewer to scan said barcode in order to obtain the desired tag data.

Figure 17:
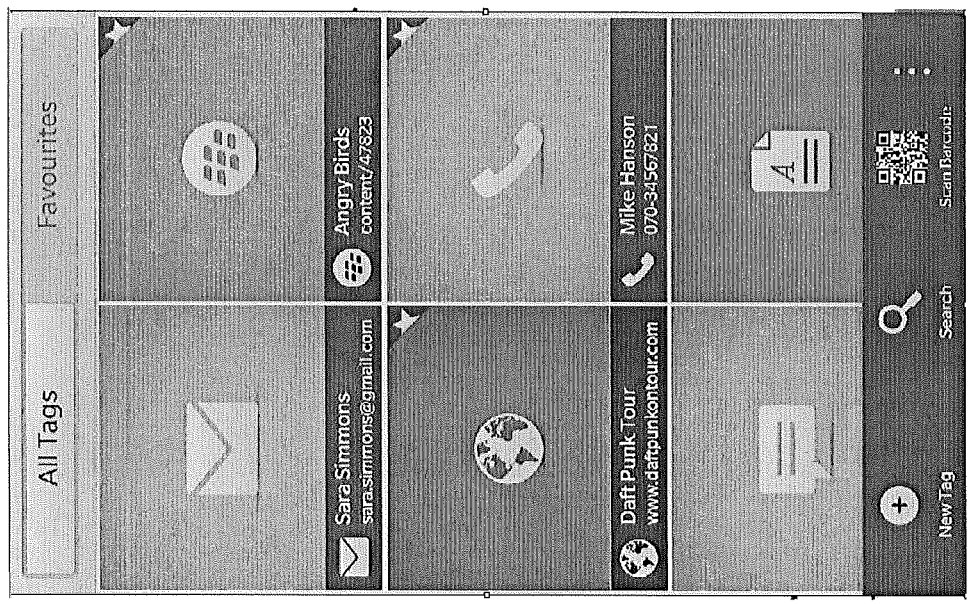
FIG. 17 illustrates a device display having display and selectable features in accordance with an exemplary embodiment of the present disclosure.

As illustrated in FIG. 17, a user may be enabled to navigate to additional overflow menu options, such as by actuating an arrow to move to a right menu from the then-currently displayed menu. Overflow menu options may include, for example, block tag, which allow a user to prevent additional data from being written to a physical tag owned by or associated with that user and that user's tag log. Moreover, the overflow menu may allow the user to select multiple tags, such as to group tags for display, or to permit for multiple deletions and/or multiple sharings.

Figure 18B:
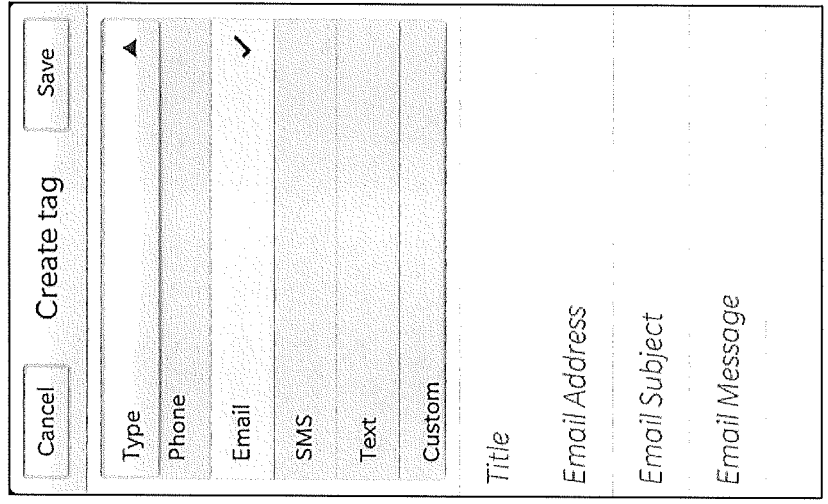
FIGS. 18A and 18B illustrate a device display having display and selectable features in accordance with an exemplary embodiment of the present disclosure.
Figure 18A:
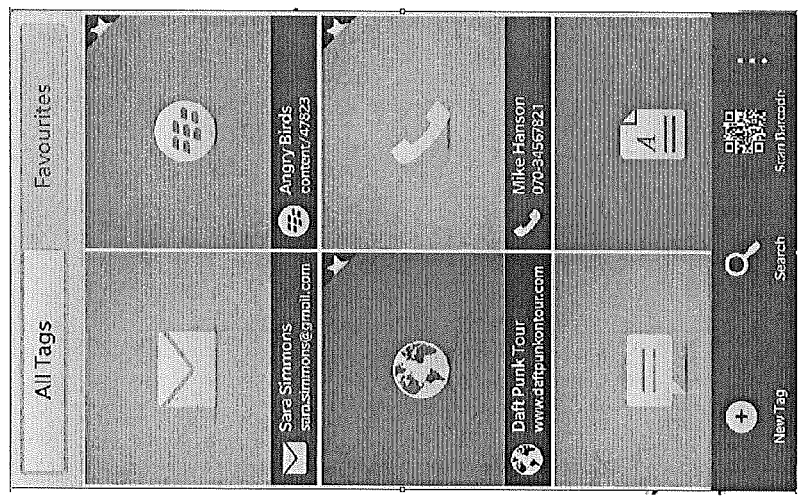

As illustrated in the screen shots of FIGS. 18A and 18B, a user may execute a tag creation option from the main display of FIG. 16 or from the overflow menu of FIG. 17, and upon this execution a tag creation wizard may be presented. The wizard may provide, for example, a template to allow for creation of a tag. The tag created may be saved, such as to the user's tag log. Correspondingly, a user may cancel a tag creation, such as by actuating a cancel button if data has been entered, or a user may actuate a back button to move backwards in the process of tag creation.

Further, the tag creation wizard may allow a user to select, such as via a drop-down menu, among several different tag types, which may include phone, email, SMS, text, URL, app world, geo location, or custom. Moreover, the content fields selectable in the tag wizard may be dependent upon the tag type and may likewise be selected from a drop-down, for example. The content fields may include, by way of non-limiting example, a title, phone number, email address, email subject, email message, SMS message, body text, browser linked URL, an app world or app store link URL, latitude value, or longitude value.

Figure 19B:
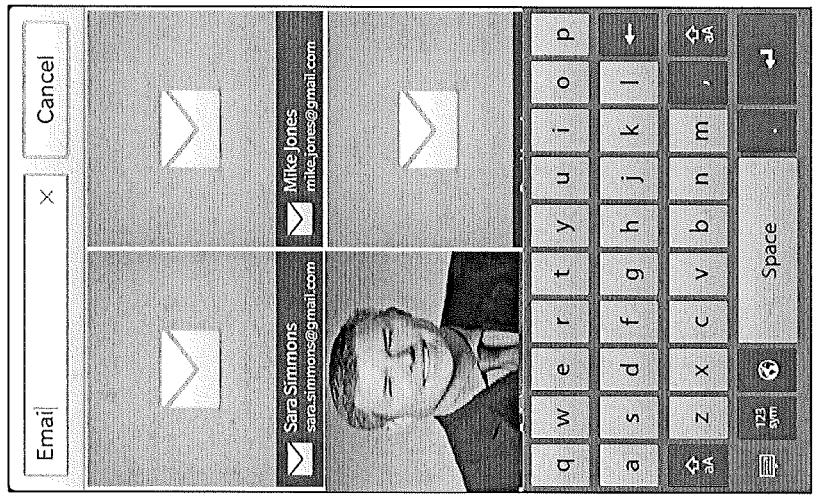
FIGS. 19A and 19B illustrate a device display having display and selectable features in accordance with an exemplary embodiment of the present disclosure.
Figure 19A:
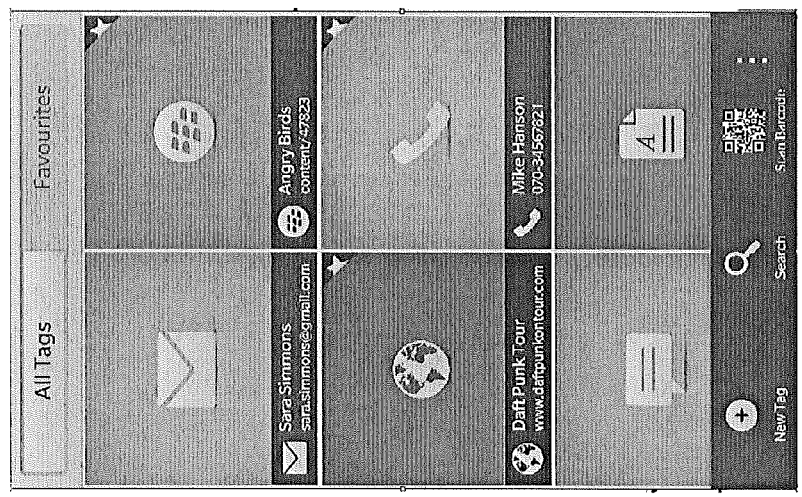

As illustrated in FIGS. 19A and 19B, upon actuation of a search mechanism, the user may be presented with a search display page. In such an embodiment, the segmented header may be removed in order to allow for search features. For example, the search feature may allow a user to search a tag log categorically, by tag title, by tag type, by content, or the like. In exemplary embodiments, the search feature may be a free-form text search. In the example illustrated, the user has searched for all tags in the tag log having a type "email". Correspondingly, all tags having associated therewith an email aspect are displayed in the search window, including email address tag data, contacts (PIM) tag data (which may include photographs), and the like, etc. Further, standard search expansion options may be available at the bottom of the search page, thereby allowing for expansion of search options to device searches, universal searches or web searches, by way of non-limiting example.

Figure 20C:
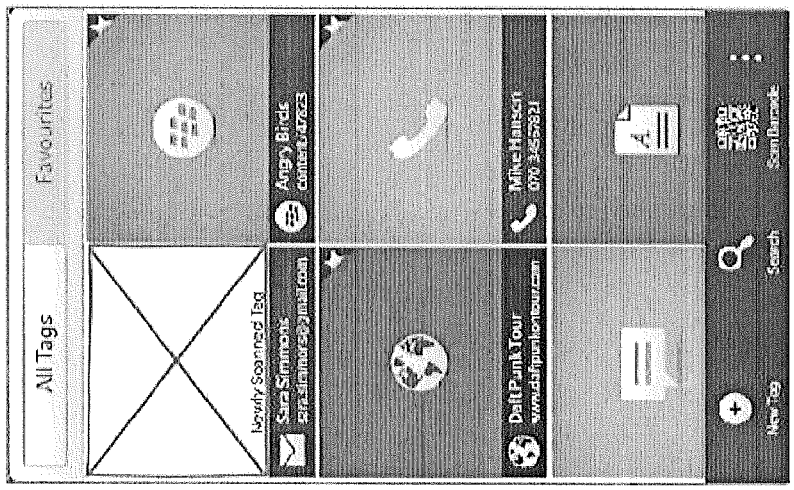
FIGS. 20A, 20B and 20C illustrate a device display having display and selectable features in accordance with an exemplary embodiment of the present disclosure.
Figure 20B:
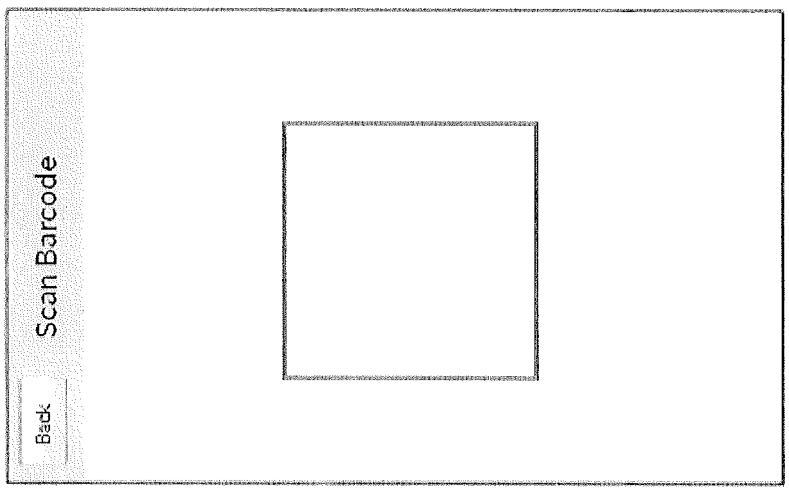
Figure 20A:
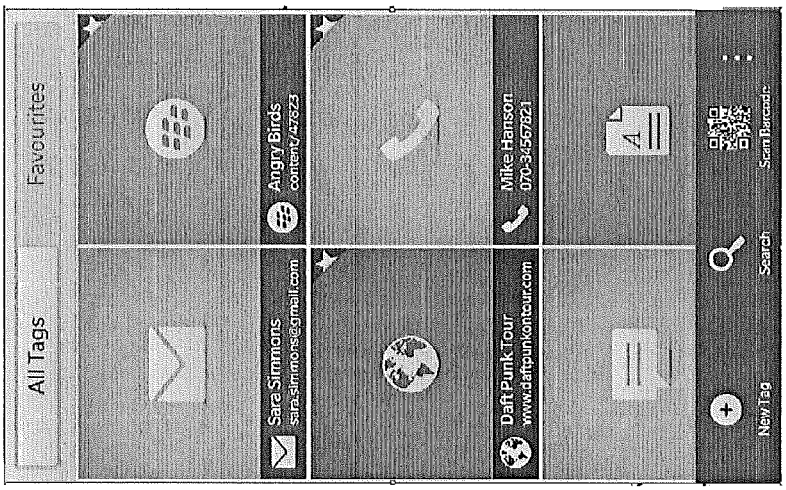

As illustrated in FIGS. 20A, 20B and 20C, a barcode display and/or scan feature may be provided on or in association with the log page. For example, upon actuating a "scan barcode" button, a display may be generated with a camera viewer. For example, such a display may take up the entire device display screen, and may have, approximately in the center thereof, a square, such as a colored square, such as a red square, to allow the user to center a barcode for target reading. Once the barcode is scanned, tag data associated therewith may be used to generate a tag display and/or to generate an entry into the tag log, which inclusion of the newly scanned tag in the tag log, including the category and related data information of the tag reads, is illustrated in FIG. 20C.

Figure 21C:
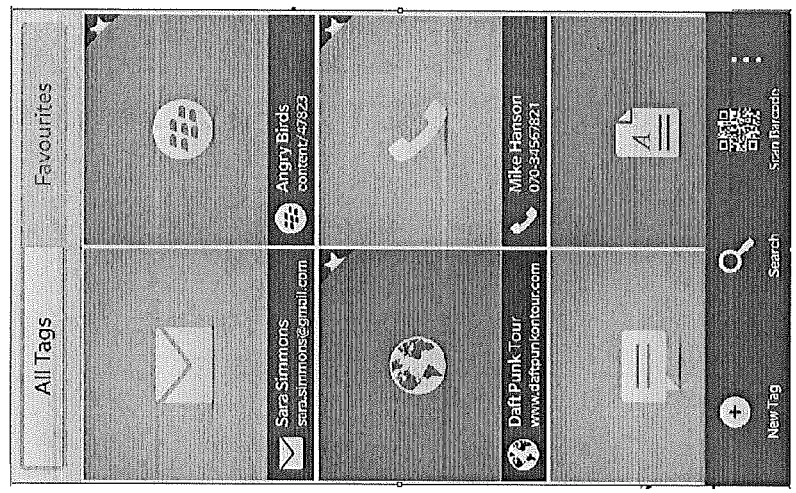
FIGS. 21A, 21B and 21C illustrate a device display having display and selectable features in accordance with an exemplary embodiment of the present disclosure.
Figure 21B:
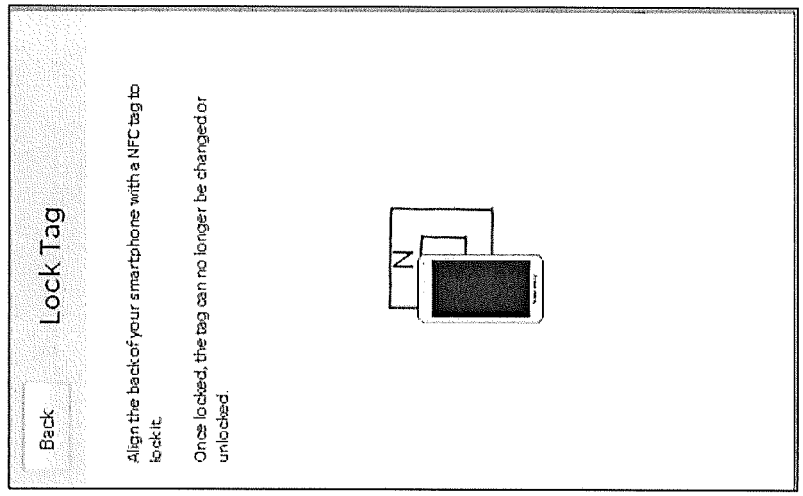
Figure 21A:
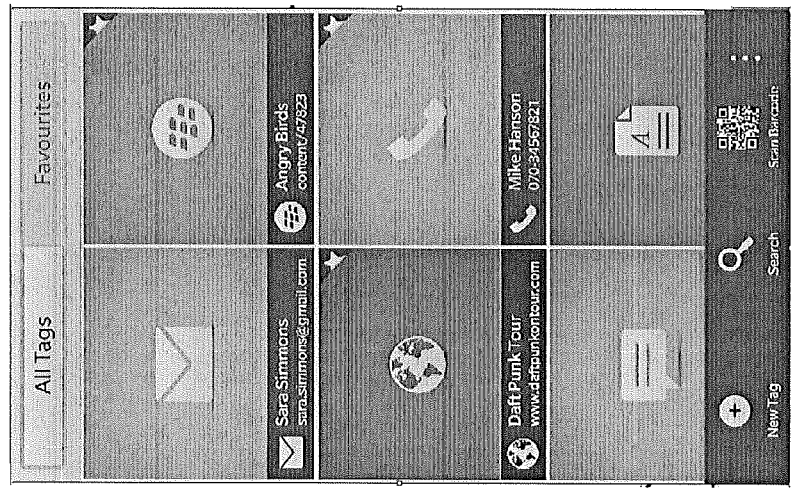

FIGS. 21A, 21B and 21C illustrate the locking of a physical tag. As illustrated, the user may select to "lock tag" from a menu, such as from the overflow menu. Thereafter, a display may be provided instructing the user to elect whether or not to lock the subject tag. Responsive to the presentation of this display, the NFC reader/writer circuitry and transmitter of NFC subsystem 8132 may be enabled. Finally, the user may be returned to the tag log once the locking has been completed successfully.

Figure 22:
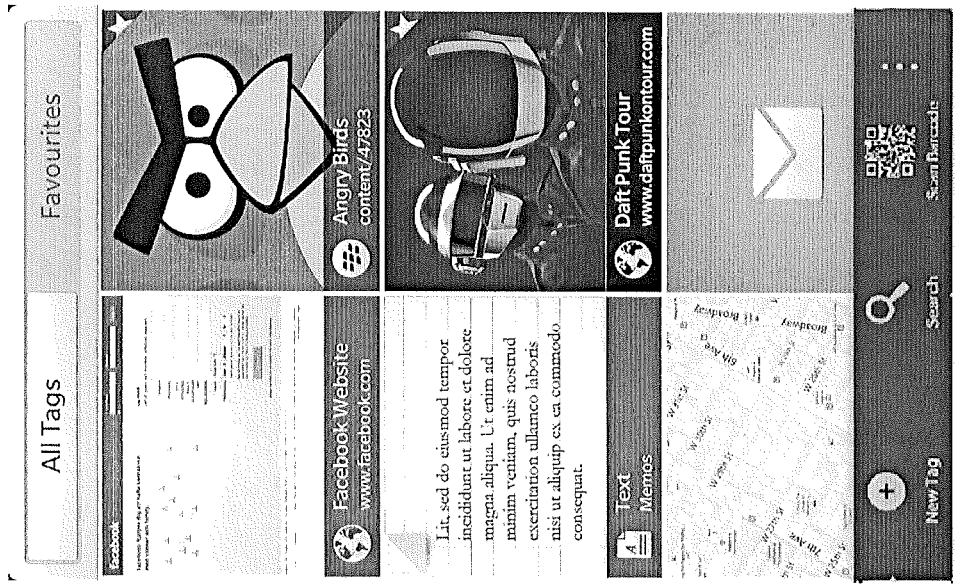
FIG. 22 illustrates a device display having display and selectable features in accordance with an exemplary embodiment of the present disclosure.

As illustrated in FIG. 22, a plurality of tag data items, which may include data stored locally and data indicated from a tag read remotely, may be categorically displayed in the tag log. Correspondingly, a single tag may be selected from the tag log, whereupon the tag will be opened using the default application needed to obtain and execute the tag data. Interactions may include, for example, an email tag that may open with a composed view for default personal email. The email tag may pre-populate the addressee, subject and/or body, if so defined by the tag data. However, the subject email may not be sent immediately, but rather may be sent only upon direction by the user. Likewise, an SMS tag may open, and may include a composed view for SMS. The SMS tag may cause pre-population of the addressee and/or SMS body, if so defined by the tag. The SMS tag may not cause immediate sending of a generated SMS. Similarly, a URL tag may cause the opening of an on-board browser, and the browser may be directed to open the page specified by the tag. Further, a phone tag may open in a phone dialer, and may cause pre-population of the phone number indicated by the tag. However, the subject phone number may not be dialed until an instruction to do so by the user. A geo tag may open in a map application, a webpage, or the like, whereupon the address specified by latitude, longitude values may be shown. A text tag may open in a text app, with the text and/or text document displayed. An app world or app store tag may be opened in the app world or in the app store, and the user device may be directed to the subject app product page of the app indicated by the tag read.

Figure 23:
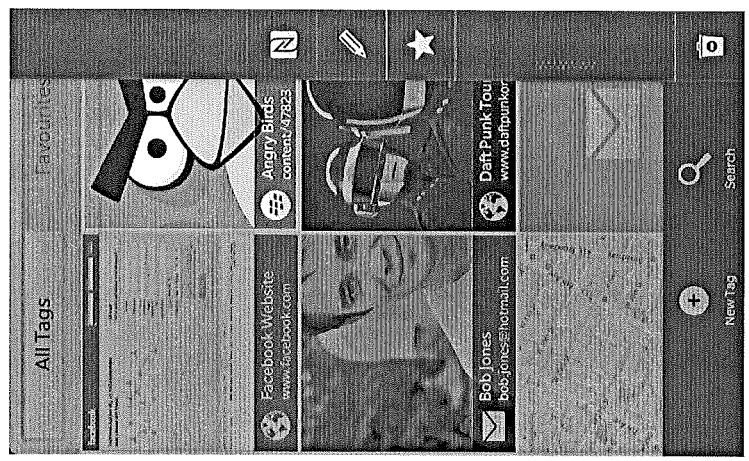
FIG. 23 illustrates a device display having display and selectable features in accordance with an exemplary embodiment of the present disclosure.

As illustrated in FIG. 23, further tag related app actions may be made available by a crosscut, such as using an actuatable side-bar menu. For example, such actions may include write to physical tag, which allows the user to write the selected tag to a physical tag using the NFC antenna 8132b. Further included may be an edit tag feature, which allows the user to edit the data fields for the selected tag. Also included may be "mark as favorite", which allows the user to add the tag to a favorites list. The user may also be enabled to delete a tag, such as by putting the tag into a trashbin.

Figure 24C:
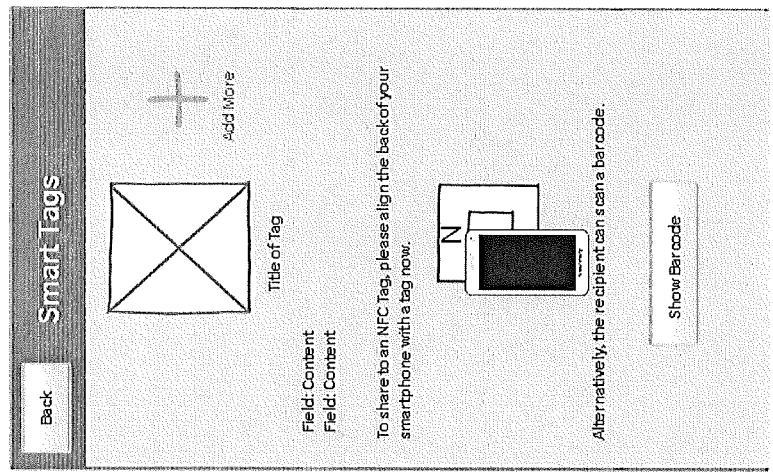
FIGS. 24A, 24B, 24C and 24D illustrate a device display having display and selectable features in accordance with an exemplary embodiment of the present disclosure.
Figure 24B:
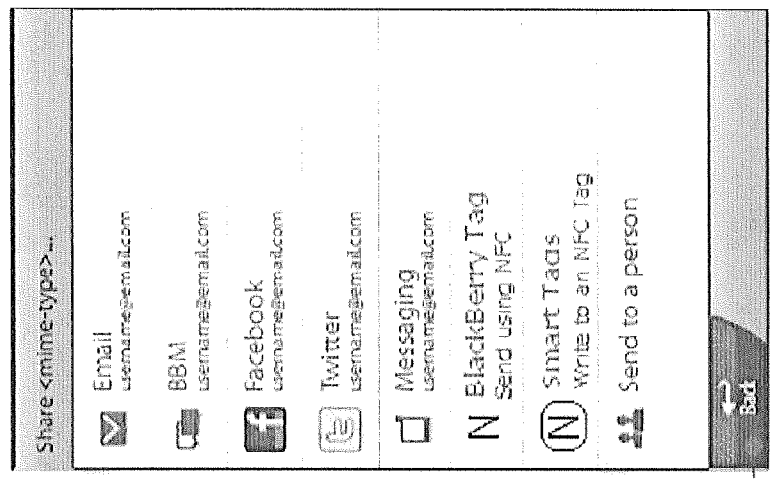
Figure 24A:
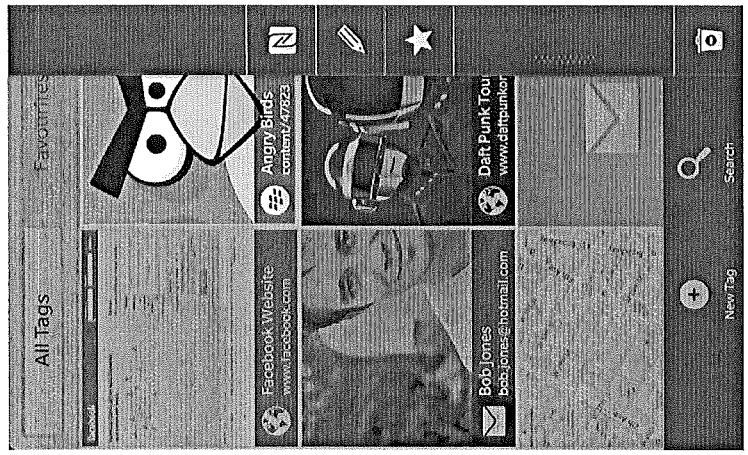
Figure 24D:
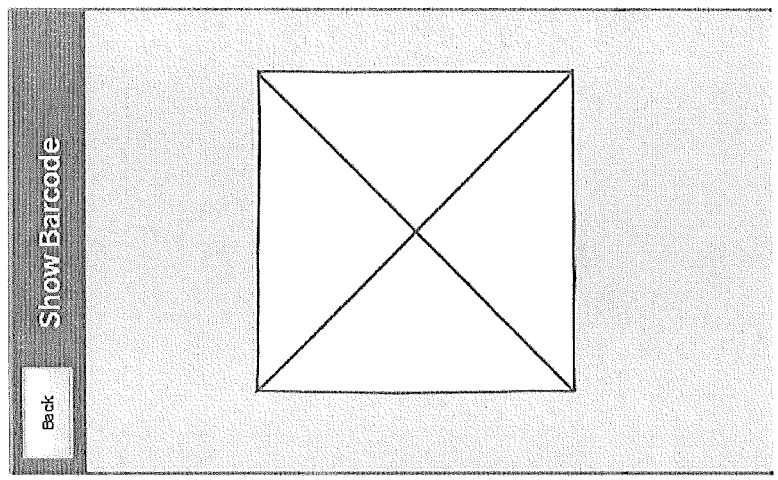

As is illustrated in FIGS. 24A, 24B and 24C, and as discussed above, a tag may be shared. Such sharing may occur upon a direction from a base menu, and/or from a sidebar menu, for example. As shown, the user may actuate a share feature, whereupon the user may be shown a standard share user interface. The user may select the tag log from the share list in order to enable sharing of the smart tags within the tag log. Upon selection of a smart tag to share from the smart tag log, and as illustrated in FIG. 24C, the user may be shown a preview of the tag and content to be shared, and instructions on how to share the tag. The user may be enabled to choose to show an indicator, such as a barcode, to a fellow user in order to allow the sharing to occur, such as wherein the second user receiving the share may execute a barcode scan to obtain the tag data as discussed above. Upon selection of the sharing by a barcode feature, the device may display the barcode related to the tag to be shared, as illustrated in FIG. 24D.

Figure 25B:
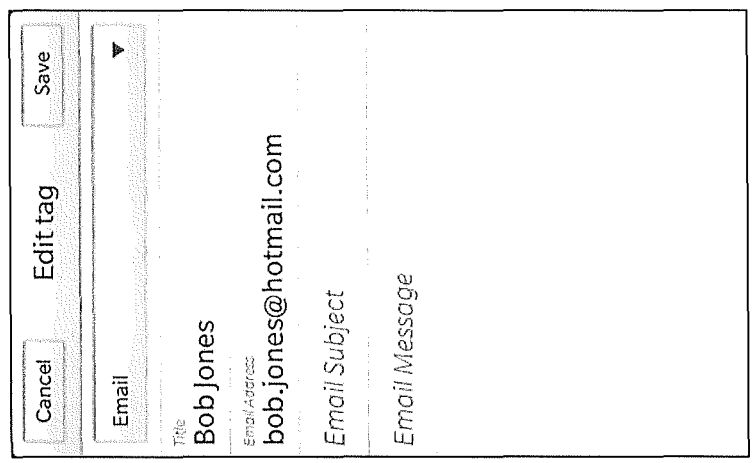
FIGS. 25A and 25B illustrate a device display having display and selectable features in accordance with an exemplary embodiment of the present disclosure.
Figure 25A:
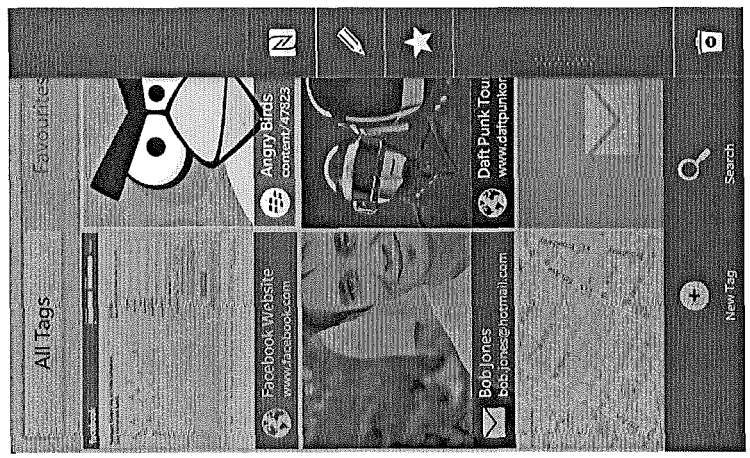

As illustrated in FIGS. 25A and 25B, a tag may be edited, such as based on an actuation from a base display menu or from a sidebar menu, by way of non-limiting example. As shown, upon selection of an edit tag feature and a subject tag, a display may be provided with a form template for editing the selected tag. Available edits may include, by way of non-limiting example, drop-down edits, free form text edits, search, texts, tag types, and the like. As shown, a user may elect to save edits, cancel edits, or go back to a prior screen.

Figure 26B:
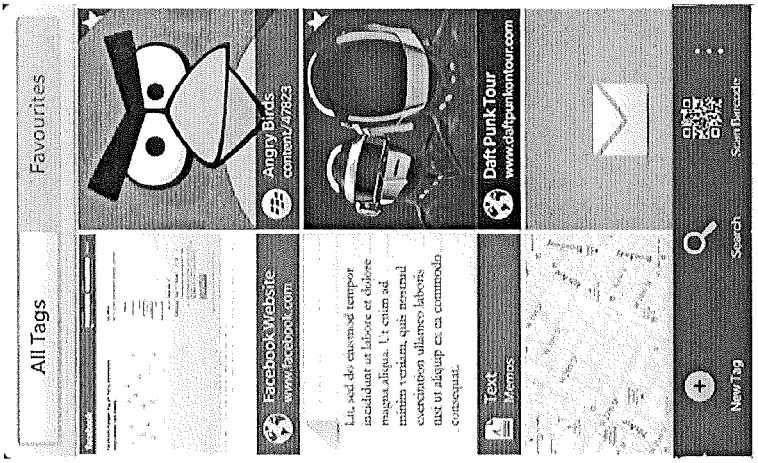
FIGS. 26A and 26B illustrate a device display having display and selectable features in accordance with an exemplary embodiment of the present disclosure.
Figure 26A:
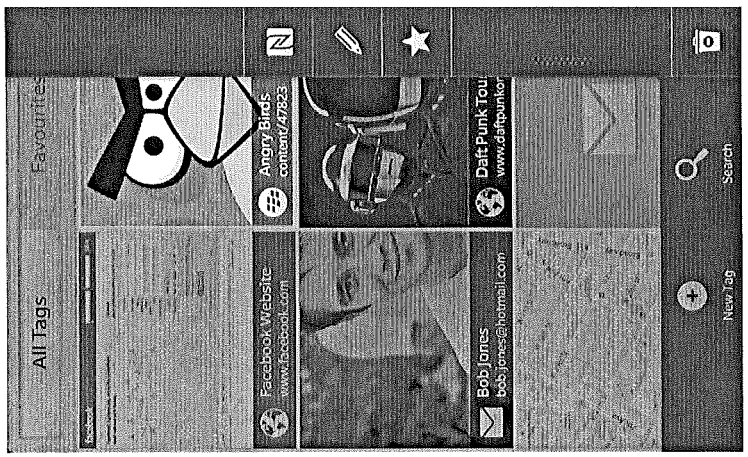

As is shown in FIGS. 26A and 26B, not only may the user edit a tag, but a user may delete a tag. For example, a tag may be selected, followed by selection of a deletion item, such as a trash can icon. Upon such an actuation, the user may or may not be asked to confirm the deletion. Upon deletion, the user may be returned to a tag log grid view such as with the deleted tags now removed from the log.

Figure 27:
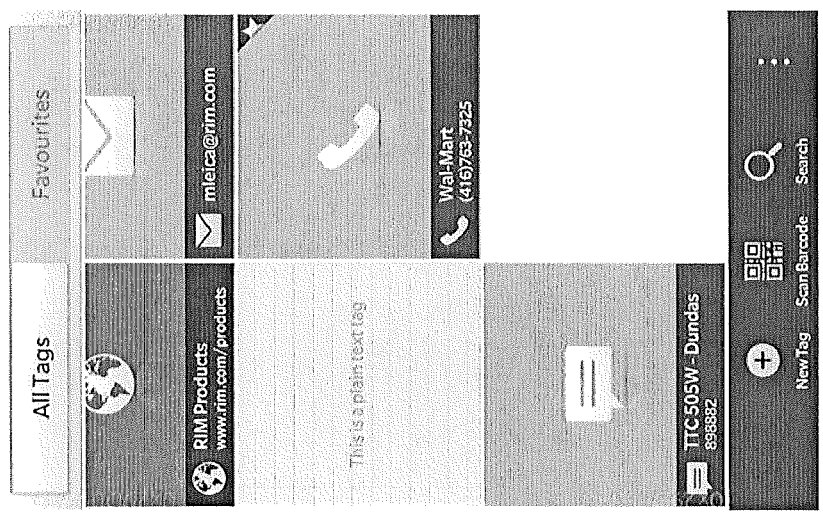
FIG. 27 illustrates a device display having display and selectable features in accordance with an exemplary embodiment of the present disclosure.
Figure 28:
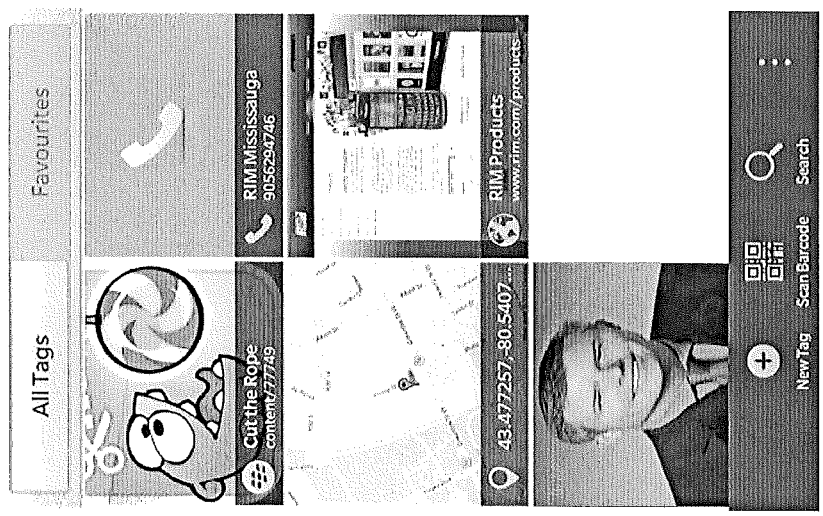
FIG. 28 illustrates a device display having display and selectable features in accordance with an exemplary embodiment of the present disclosure.

FIGS. 27-34 illustrate a plurality of embodiments in which a categorical tag log is displayed to the user to allow for the foregoing interactions with the tag log. For example, FIG. 27 illustrates tags related to products, an email tag, a plain text tag, a telephone tag, and an instant message tag. FIG. 28 illustrates a game tag, a telephone tag, a geo location tag, a product tag, and a contacts tag of a particular fellow user.

Figure 29:
FIG. 29 illustrates a device display having display and selectable features in accordance with an exemplary embodiment of the present disclosure.

FIG. 29 shows a search feature in conjunction with several tags in the tag log, including several group category tags. As shown, groups include all tags related to Solstice Restaurant, all four tags related to Blackberry devices, and all six tags of games created by Electronic Arts (EA) gaming.

Figure 30:
FIG. 30 illustrates a device display having display and selectable features in accordance with an exemplary embodiment of the present disclosure.
Figure 31:
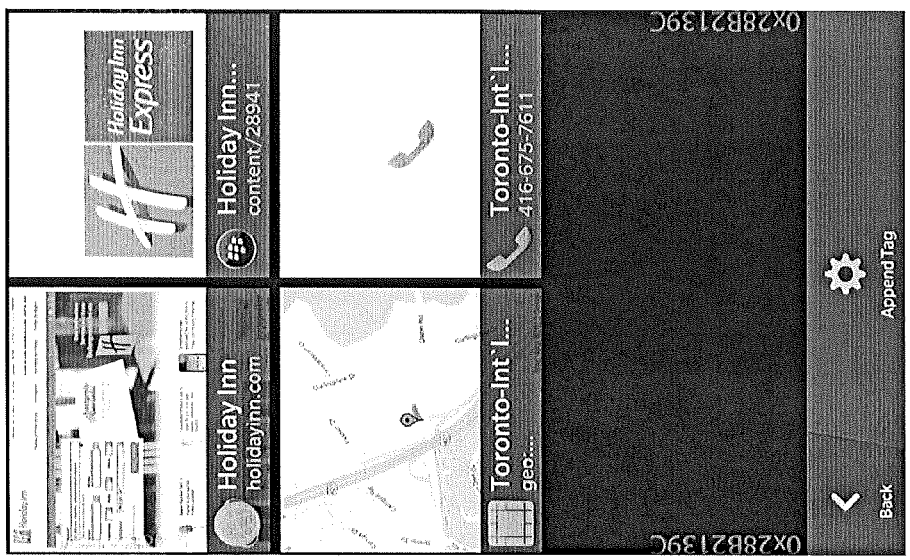
FIG. 31 illustrates a device display having display and selectable features in accordance with an exemplary embodiment of the present disclosure.

FIG. 30 shows a drill down to the plurality of tags in the tag log that are appended in the EA gaming group tag of FIG. 29. For example, the group shown is thus all Electronic Arts games, and additional tags also falling within this category and/or group may be later appended to the subject group from the screen of FIG. 30, as indicated by way of example in the lower portion of the illustrated display. Likewise, FIG. 31 illustrates all travel tags included within a travel group shown in FIG. 29. Additional travel tags may be appended to this group, as discussed above.

Figure 32:
FIG. 32 illustrates a device display having display and selectable features in accordance with an exemplary embodiment of the present disclosure.
Figure 33:
FIG. 33 illustrates a device display having display and selectable features in accordance with an exemplary embodiment of the present disclosure.
Figure 34:
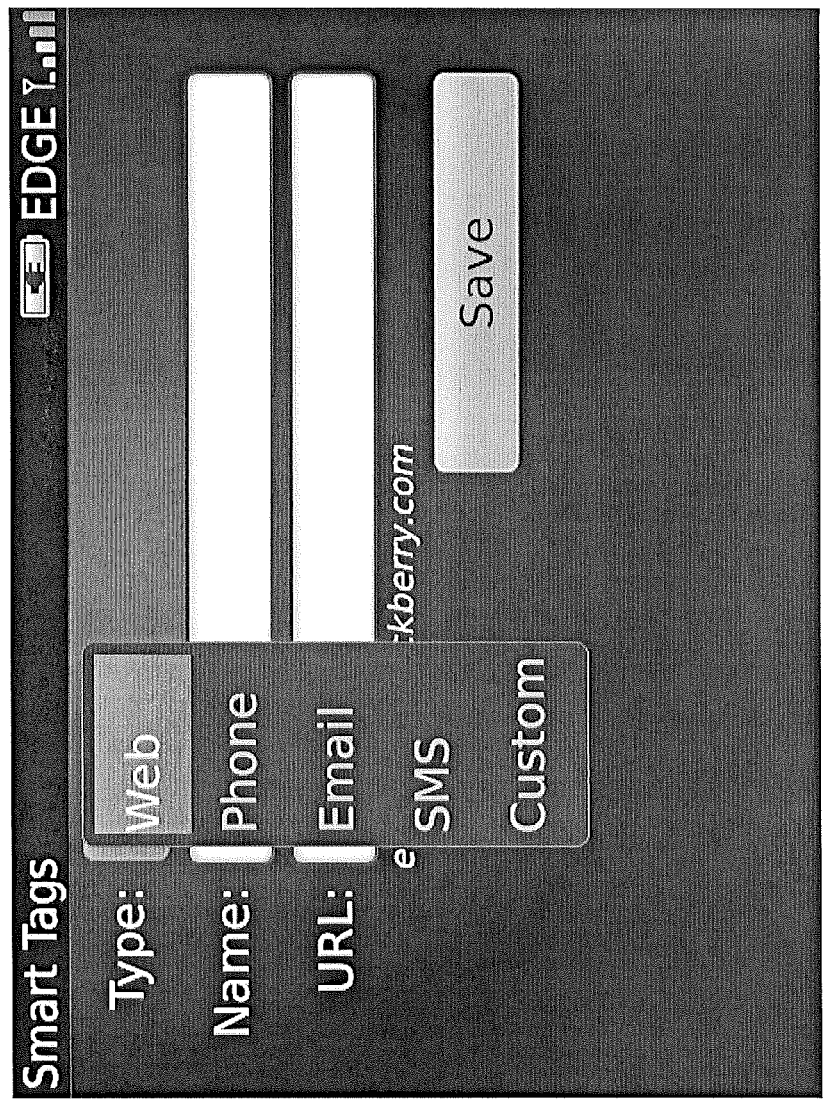
FIG. 34 illustrates a device display having display and selectable features in accordance with an exemplary embodiment of the present disclosure.

FIG. 32 shows an additional embodiment, wherein the categories may not be indicated by groups or colors, but rather may be driven by icon indicators. In the illustrated embodiment, telephone tags are provided in a line tile format and are indicated by a telephone icon, and URL tags are likewise provided in a line tile format and are indicated by a web browser icon.

In such embodiments, and as discussed above with reference to a tiled and/or colored categorized tag log display, a tag may be readily created from a line tile display view. In such embodiments, a pop-up menu may be actuated, such as is shown in the lower portion of FIG. 33, wherefrom "Create Tag" may be selected. Thereafter, the user may select a tag type, responsive to which selection the user may be provided with a template in order to generate the tag data, such as a reference URL at which the tag data is located and from which data may be obtained upon a tag read. This is shown in the exemplary illustration of FIG. 34. Those skilled in the art will appreciate that such a smart tag read need not be a physical tag read, but rather may include virtual tag constituting a reading of the tag from the tag log on board the device, which reading of the tag from the tag log may or may not correspond to a previously read physical tag.

While the systems and methods disclosed herein have been discussed in relation to Near Field Communication technology, it should be understood that same systems and methods may be applied to other technology which may be similar in some respects such as, for example, other forms of short range communication technology, barcodes or the like.

In related aspects, the apparatuses disclosed may include additional processor components, which may be in operative communication with other components via buses or via similar communication coupling. The respective processors may effect some or all of the processing of, and/or the initiation and/or scheduling of, the processes and/or functions performed by the electrical components discussed throughout.

In other related aspects, exemplary apparatuses as described herein may include additional radio transmitter/receiver components. The apparatuses may also include or include additional network interfaces and/or network controllers (not shown) for connecting to one or more network entities. The disclosed apparatuses may optionally include additional components for storing information, such as, for example, a memory device/computer readable medium, or other computer readable medium such as a magnetic or optical drive. Such computer readable media may be operatively coupled to the processor(s), memory component(s), or other components of the apparatuses, such as via busses or the like. Such data storage components may be adapted to store computer readable instructions and data for affecting the processes and behavior of the components described in each of the apparatuses, and subcomponents thereof, and/or the processors, and/or the methods disclosed herein. The memory components described herein may retain instructions for executing functions associated with various components of the apparatuses. While shown as being distinct from the memory and processing components, it is to be understood that one or more of the other components may be realized within or in cooperation with the memory and processing components illustrated. It is further noted that the components shown may comprise their own respective processors, electronic devices, hardware devices, electronic sub-components, logical circuits, memories, software codes, firmware codes, etc., or any combination thereof.

Information and signals discussed herein may be represented using any of a variety of techniques. More particularly, data, instructions, commands, actions, information, signals, or symbols that may be referenced herein may be realized using, or may at least in part represent, voltages, currents, electromagnetic waves, magnetic fields or particles, optical fields or particles, or any combination thereof.

Further, the various illustrative logical blocks, modules, circuits, methods and algorithm steps described in connection with the herein disclosed devices, systems, and methods may be implemented using specialized or general purpose electronic hardware and/or software. Because the devices, systems, and methods described herein may be implemented in a variety of manners and constructions, the various illustrative components, blocks, modules, circuits, and steps have been described above generally in terms of their functionality. Whether such functionality is implemented in hardware alone or in combination with software or the like (e.g., firmware) depends upon the particular application, skill of the artisan, and design constraints imposed on the overall system.

The various illustrative logical blocks, modules, and circuits described herein may be implemented or performed using one or more processors, digital signal processors (DSPs), application specific integrated circuits (ASICs), field programmable gate arrays (FPGAs) and/or other programmable logic devices, discrete gates or transistor logic, discrete hardware components, or any combination thereof capable of implementing the methods and algorithms and performing the functions described herein. A general-purpose processor may be a microprocessor, but in the alternative, the processor may be or include any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Software modules discussed herein may reside in RAM memory, flash memory, ROM memory, EPROM memory, EEPROM memory, registers, hard disk, a removable disk, a CD-ROM, or any other form of volatile or non-volatile solid state, magnetic, optical, or other processor or computer readable data storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

If the designs herein are at least partially implemented in software, the functions may be stored or transmitted as one or more instructions or code in a non-transitory manner on or using at least one computer-readable medium. Computer-readable media may include both computer storage media and communication media, including any medium that facilitates transfer of a computer program, action, or other computer readable data from one place to another. A storage medium may be or include any medium that can be accessed and processed by a general purpose or special purpose computer. Also, any connective hardware may be considered to be within the scope of a computer-readable medium. For example, if information is transmitted from a website, server, or other remote source using a coaxial cable, fiber optic cable, twisted pair, digital subscriber line (DSL), or wireless technologies such as infrared, radio, microwave, or the like, then the coaxial cable, fiber optic cable, twisted pair, DSL, or wireless technologies such as infrared, radio, microwave, or the like may be included in the definition of medium.

Additionally provided herein are a series of particular exemplary applications and/or embodiments illustrative of the applicability of aspects of the herein disclosed devices, systems, and methods in a variety of contexts. As will be appreciated in light of the instant disclosure, the disclosure is not limited to these examples, but rather is inclusive of all embodiments for which the illustrative aspects described herein may be realized.

Those of skill in the art will appreciate that the herein described systems and methods may be subject to various modifications and alternative constructions. There is no intention to limit the scope of the disclosure to the specific exemplary embodiments, applications, and/or constructions described herein. Rather, the herein described devices, systems and methods are intended to cover all modifications, alternative constructions, and equivalents falling within the scope and spirit of the claimed invention and its equivalents.

What is claimed is:

1. An electronic device, comprising:
   at least one processor; computer storage associated with the at least one processor; and a display;
   the computer storage operable to store a plurality of data assets associated with a plurality of Near Field Communication (NFC) tags; and
   the processor operable to group data assets associated with each of a plurality of NFC tags and to cause display of grouped data assets associated with each of a plurality of the NFC tags.

2. The electronic device of claim 1, comprising an NFC system operable to transfer data assets associated with at least one NFC tag from the computer storage to at least one other NFC-enabled device.

3. The electronic device of claim 2, wherein the at least one other NFC-enabled device comprises a passive NFC device.

4. The electronic device of claim 2, wherein the at least one other NFC-enabled device comprises an active NFC device.

5. The electronic device of claim 1, comprising at least one input device; the at least one input device operable to generate data assets to be associated by the at least one processor with at least one NFC tag and stored in the computer storage.

6. The electronic device of claim 5, the processor further operable to display a user interface comprising a template useable by a user of the device to create data assets for storage in the computer storage.

7. The electronic device of claim 1, wherein the plurality of data assets comprises code associated with at least one computer executable instruction.

8. The electronic device of claim 1, wherein the plurality of data assets comprises at least one address pointer associated with data assets stored remotely from the device.

9. The electronic device of claim 1, wherein the plurality of data assets comprises content data.

10. The electronic device of claim 1, wherein the processor causes the grouped data to be displayed in a visually divided format.

11. The electronic device of claim 10, wherein the visually divided format comprises a plurality of tiles.

12. The electronic device of claim 10, wherein the visually divided format comprises a plurality of at least one of folders, color coding and icons.

13. An method of processing data associated with Near Field Communication (NFC) devices, the method comprising at least one processor of an NFC enabled device:
   accessing computer storage associated with the at least one processor;
   grouping a plurality of data assets stored in the computer storage with each of a plurality of NFC tags; and
   displaying grouped data assets associated with each of a plurality of the NFC tags on a display of the NFC device.

14. The method of claim 13, comprising an NFC system of the NFC enabled device transferring data assets associated with at least one NFC tag from the computer storage to at least one other NFC-enabled device.

15. The method of claim 14, wherein the at least one other NFC-enabled device comprises a passive NFC device.

16. The method of claim 14, wherein the at least one other NFC-enabled device comprises an active NFC device.

17. The method of claim 13, comprising:
   generating, using input from at least one input device of the NFC-enabled device, data assets associated with at least one NFC tag; and
   storing the generated data assets in the computer storage.

18. The method of claim 13, comprising displaying a user interface comprising a template useable by a user of the device to create data assets for storage in the computer storage.

19. The method of claim 13, wherein the plurality of data assets comprises code associated with at least one computer executable instruction.

20. The method of claim 13, wherein the plurality of data assets comprises at least one address pointer associated with data assets stored remotely from the device.

21. The method of claim 13, wherein the plurality of data assets comprises content data.

22. The method of claim 13, wherein the processor causes the grouped data to be displayed in a visually divided format.

23. The method of claim 22, wherein the visually divided format comprises a plurality tiles.

24. The method of claim 22, wherein the visually divided format comprises at least one of folders, color coding and icons.

25. A non-transitory computer-readable medium or media comprising computer-executable instructions configured to cause at least one processor of a Near Field Communication (NFC) device to:
  access computer storage associated with the at least one processor;
  group a plurality of data assets stored in the computer storage with each of a plurality of NFC tags; and
  display the grouped data assets associated with each of a plurality of the NFC tags on a display of the NFC device.

26. The medium or media of claim 25, comprising computer-executable instructions configured to cause an NFC system of the NFC enabled device to transfer data assets associated with at least one NFC tag from the computer storage to at least one other NFC-enabled device.

27. The medium or media of claim 26, wherein the at least one other NFC-enabled device comprises a passive NFC device.

28. The medium or media of claim 26, wherein the at least one other NFC-enabled device comprises an active NFC device.

29. The medium or media of claim 25, comprising computer-executable instructions configured to cause the NFC-enabled device to:
  generate, using input from at least one input device of the NFC-enabled device, data assets associated with at least one NFC tag; and
  store the generated data assets in the computer storage.

30. The medium or media of claim 25, comprising computer-executable instructions configured to cause the NFC-enabled device to display a user interface comprising a template useable by a user of the device to create data assets for storage in the computer storage.

31. The medium or media of claim 25, wherein the plurality of data assets comprises code associated with at least one computer executable instruction.

32. The medium or media of claim 25, wherein the plurality of data assets comprises at least one address pointer associated with data assets stored remotely from the device.

33. The medium or media of claim 25, wherein the plurality of data assets comprises content data.

34. The medium or media of claim 25, comprising computer-executable instructions configured to cause the at least one processor to display the grouped data in a visually divided format.

35. The medium or media of claim 34, wherein the visually divided format comprises a plurality tiles.

36. The medium or media of claim 34, wherein the visually divided format comprises at least one of folders, color coding and icons.

* * * * *